US012811412B2

(12) United States Patent
Wee et al.

(10) Patent No.: US 12,811,412 B2
(45) Date of Patent: Nov. 24, 2026

(54) ADAPTIVE POWER CONTROL FOR INDIRECT POWER MODE

(71) Applicant: Infineon Technologies AG, Neubiberg (DE)

(72) Inventors: Tue Fatt David Wee, Singapore (SG); Kwan Siong Choong, Singapore (SG); Siak Pin Lim, Johor (MY); Kiat How Tan, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 1281 days.

(21) Appl. No.: 17/559,425

(22) Filed: Dec. 22, 2021

(65) Prior Publication Data

US 2022/0216708 A1 Jul. 7, 2022

(30) Foreign Application Priority Data

Jan. 6, 2021 (EP) .................................... 21150383

(51) Int. Cl.
*H02J 7/42* (2026.01)
*H02J 7/40* (2026.01)
*H02J 7/44* (2026.01)
*H02J 7/90* (2026.01)

(52) U.S. Cl.
CPC .................. *H02J 7/42* (2026.01); *H02J 7/40* (2026.01); *H02J 7/44* (2026.01); *H02J 7/933* (2026.01); *H02J 2207/30* (2020.01)

(58) Field of Classification Search
CPC ............... H02J 7/00032; H02J 7/00034; H02J 7/00036; H02J 7/00038; H02J 7/00041; H02J 7/00043; H02J 7/00054; H02J 7/00; H04L 12/40045
See application file for complete search history.

(56) References Cited

U.S. PATENT DOCUMENTS 6,532,506 B1 3/2003 Dunstan et al.
8,661,268 B2 * 2/2014 Brooks ................... G06F 1/266 713/340
11,025,084 B2 * 6/2021 Ding .................... H04R 1/1016
11,106,615 B2 * 8/2021 Ngo .................... G06F 13/1668
2008/0298385 A1 * 12/2008 Ng .................... H04L 12/40032 370/445
2015/0192974 A1 * 7/2015 Ngo .......................... G06F 1/26 713/322
2017/0255250 A1 * 9/2017 Ngo .................... G06F 13/4282
2018/0217959 A1 8/2018 Ngo et al.
2020/0226089 A1 * 7/2020 Ngo .................... G06F 13/4295
2020/0341939 A1 * 10/2020 Hietala ................. G06F 13/362
2021/0149468 A1 * 5/2021 Walsh ..................... H02J 1/084
2021/0218595 A1 * 7/2021 Liu ..................... G06F 13/4059
2022/0166644 A1 * 5/2022 Ngo .................... H04L 25/4902

* cited by examiner

*Primary Examiner* — Julian D Huffman
*Assistant Examiner* — John P Ondrasik
(74) *Attorney, Agent, or Firm* — Murphy, Bilak & Homiller, PLLC

(57) ABSTRACT

According to various aspects, a device is provided. The device is configured to receive a signal, the signal being configured to provide power and data to the device. The device includes: a charge storage element configured to be charged by the power provided by the received signal; and a charging control circuit configured to control a charging of the charge storage element by the power provided by the received signal, based on the data provided by the received signal.

20 Claims, 12 Drawing Sheets

ADAPTIVE POWER CONTROL FOR INDIRECT POWER MODE

TECHNICAL FIELD

Various aspects relate to a device and methods thereof, e.g. a method for operating a device.

BACKGROUND

In general, various devices have been developed for single-wire implementations. In a single-wire interface, a host (master) device is connected with one or more single-wire (slave) devices via a single-wire connection over which data and power may be transferred. A single-wire device is capable of receiving data and power via the single-wire connection, and is capable of transmitting data to the host device via the single-wire connection, thus providing bi-directional communication. A single-wire device may be configured to provide various functionalities such as authentication, sensing, and data storage, as examples.

SUMMARY

According to an embodiment of a device configured to receive a signal, the signal being configured to provide power and data to the device, the device comprises: a charge storage element configured to be charged by the power provided by the received signal, wherein the data provided by the received signal define an operation of the device; and a charging control circuit configured to control a charging of the charge storage element by the power provided by the received signal, based on an expected power consumption associated with the operation defined by the data.

According to an embodiment of a system, the system comprises: a first device and a second device, wherein the first device and the second device are connected to one another via a single wire connection, the single wire connection being configured to carry a signal, the signal being configured to provide data and power to the second device, the second device comprising: a charge storage element configured to be charged by the power provided by the signal at the single-wire connection, wherein the data provided by the signal at the single-wire connection define an operation of the second device; and a charging control circuit configured to control a charging of the charge storage element by the power provided by the signal at the single-wire connection, based on an expected power consumption associated with the operation defined by the data.

According to an embodiment of a method for operating a device, the method comprises: receiving a signal configured to provide power and data to the device, wherein the data provided by the received signal define an operation of the device; charging a charge storage element by the power provided by the received signal; and controlling a charging control circuit to control a charging of the charge storage element by the power provided by the received signal, based on an expected power consumption associated with the operation defined by the data.

Those skilled in the art will recognize additional features and advantages upon reading the following detailed description, and upon viewing the accompanying drawings.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DETAILED DESCRIPTION

Figure 1:
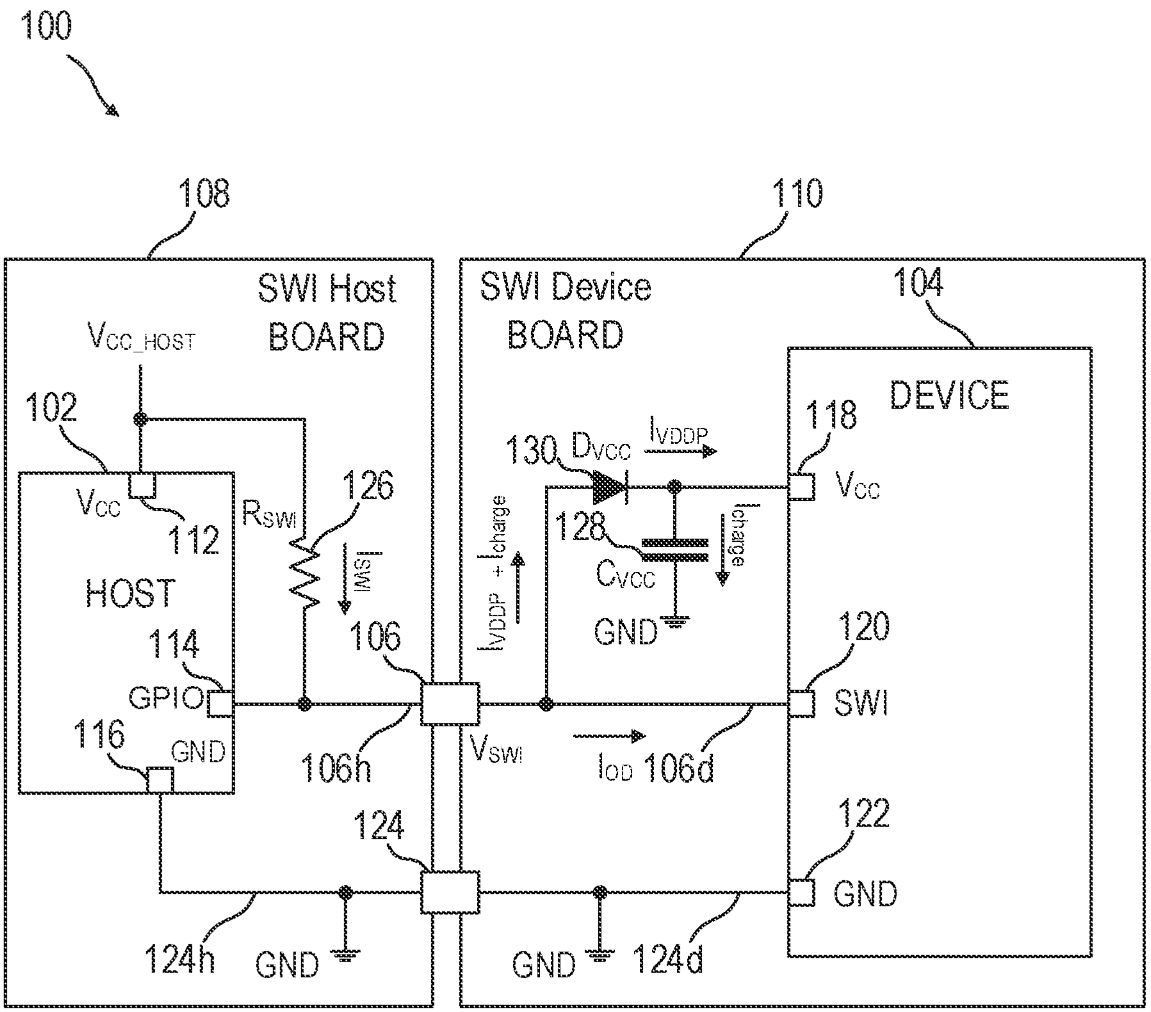
FIG. 1 shows schematically a single-wire system including a host device and a single-wire device, according to various aspects.

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects may be combined with one or more other aspects to form new aspects. Various aspects are described in connection with methods and various aspects are described in connection with devices (e.g., a single-wire device, a host device, a single-wire system, or a charging control circuit). However, it may be understood that aspects described in connection with methods may similarly apply to devices, and vice versa.

The terms “at least one” and “one or more” may be understood to include any integer number greater than or equal to one, i.e. one, two, three, four, [ . . . ], etc. The term “a plurality” or “a multiplicity” may be understood to include any integer number greater than or equal to two, i.e. two, three, four, five, [ . . . ], etc.

The phrase “at least one of” with regard to a group of elements may be used herein to mean at least one element from the group consisting of the elements. For example, the phrase “at least one of” with regard to a group of elements may be used herein to mean a selection of: one of the listed elements, a plurality of one of the listed elements, a plurality of individual listed elements, or a plurality of a multiple of listed elements.

The terms “single-wire” or “single-wire interface (SWI)” may be used herein to describe a configuration, e.g. of a system, in which an individual connecting element is used to provide data and operating power, for example to a device (or to multiple devices) connected thereto. The terms “single-wire” or “single-wire interface (SWI)” may be used herein in relation, for example, to a single-wire system, a single-wire device, a single-wire host, a single-wire signal, a single-wire connection, a single-wire protocol, and a single-wire terminal, to describe that the respective element is suitable for use in a configuration in which data and power are supplied via an individual connecting element. In some aspects, the terms “single-wire” or “single-wire interface (SWI)” may be used to describe a configuration or an arrangement even in case an additional connection may be present, e.g. even in case an additional connecting element connecting a single-wire host and a single-wire device with one another may be present to provide a reference signal (e.g., a common ground, illustratively a current return path).

The terms “host”, “host device”, “single-wire host”, “single-wire host device”, or “master device” may be used herein to describe a device (e.g., in a single-wire system) configured to instruct the operation(s) of one or more other devices (e.g., one or more slave devices, for example one or more single-wire devices). A host may be understood as a device configured to govern the transmission and the reception of data, e.g. a host may be configured to transmit data to the one or more other devices and may be configured to request the transmission of data from one or more of the other devices. Illustratively, the host may be understood as a master device to whose instructions the one or more slave devices respond. In some aspects, a host device may include one or more processors, e.g. a microcontroller, a field programmable gate array, and the like.

The term “slave device” may be used herein to describe a device (e.g., in a single-wire system) configured to be instructed by another device (e.g., configured to receive instructions from the other device, for example from a host device). A slave device may be understood as a device configured to receive instructions and to respond to the received instructions (e.g., without performing any active data transmission if not prompted). In some aspects, a slave device may be configured to transmit data (e.g., various types of information), e.g. upon request from the host device. Illustratively, the slave device may be understood as a device responding to instructions of a master device. In some aspects, a slave device may be configured to carry out a predefined or pre-programmed operation, such as transmitting authentication data, transmitting data stored in a memory of the slave device, sensing a physical quantity (e.g., temperature, humidity, and the like), as examples. In some aspects, a slave device doesn’t include any power supply or power source. Illustratively, a slave device, in some aspects, doesn’t include any built-in or integrated source of electrical power, e.g. any voltage source or current source. Examples of slave devices may include (non-exhaustive list) temperature sensors, battery monitors, devices for mobile battery applications, authenticators for determining if the host is communicating with an authenticated original product such as batteries and other replacement parts, non-volatile RAM, and silicon serial numbers.

In the context of the present description, a “single-wire device” may be described as an example of slave device, e.g. as an example of a slave device in a single-wire system. It is however understood that the aspects described herein in relation to a “single-wire device” or “single-wire slave device” may apply in an analogous manner to other types of slave devices, e.g. not in a single-wire system. Illustratively, the aspects described herein may apply to any (e.g., slave) device that receives communication and power (e.g., from a host) through a same terminal.

The term “single-wire connection” may be used herein to describe an element connecting a host device and a single-wire device with one another. In some aspects, a single-wire connection may be an individual electrically conductive path (e.g., including an electrically conductive wire, an electrically conductive trace, and the like) connecting a host device and a single-wire device with one another. In some aspects, a single-wire connection may be understood as a bus connected to a host device and to which one or more single-wire devices are connected. In some aspects, a single-wire connection may be used to transfer data between a host device and a single-wire device (e.g., in a bi-directional manner). In some aspects, a single-wire connection may be used to deliver electrical power (e.g., a current or a voltage) to a single-wire device connected to it (and to the host connected to it). A single-wire device may draw electrical power from a single-wire connection to which it is connected. Illustratively, a single-wire connection may be used to deliver a signal configured to provide data and power to a single-wire device (in some aspects, to each single-wire device) connected to the single-wire connection. A single-wire connection may be understood, in some aspects, as a communication line (or bus) which is also used to power a device connected thereto. In some aspects, a single-wire connection may include an open drain bus to which one or more devices may be connected (e.g., a host device and one or more single-wire devices). In some aspects, a single-wire connection may be considered to encompass also one or more electrically conductive elements of a device connected thereto, illustratively one or more elements via which the device is connected to the single-wire bus, such as a conductive line (or trace), and the like.

It is understood that a “single-wire connection” is described herein as an example of a connection between a host device and a slave device, e.g. in a single-wire system. The aspects described herein in relation to a “single-wire” connection may be in general understood to apply to a connection between two devices via which communication and power are transmitted (e.g., from the host device to the slave device).

The term “connected” may be used herein with respect to terminals, integrated circuit elements, devices, and the like, to mean electrically connected, which may include a direct connection or an indirect connection, wherein an indirect connection may only include additional structures in the current path that do not influence the substantial functioning of the described circuit or device. The term “electrically conductively connected” that is used herein to describe an electrical connection between one or more terminals, devices, regions, contacts, etc., may be understood as an electrically conductive connection with, for example, ohmic behavior, e.g. provided by a metal or degenerate semiconductor in absence of p-n junctions in the current path. The term “electrically conductively connected” may be also referred to as “galvanically connected”.

The terms “path”, “electrical path”, or “electrically conductive path” may be used herein to describe an electrically conductive connection between two or more elements. A path may be understood, in some aspects, as an electrically conductive line (or trace) along which a signal (in some aspects, a current or a voltage) may travel, e.g. from a first element connected to the path to a second element connected to the path or vice versa. The term path may describe a direct path or an indirect path, wherein an indirect path may only include additional structures in the path that do not influence the substantial functioning of the described circuit or device (illustratively, that do not influence the signal traveling along the path).

The term “signal” may be used herein to describe an analog signal or a digital signal. In some aspects, a signal may be an electrical signal, e.g. a current or a voltage. In some aspects, a signal may be an electrical signal configured to provide data, e.g. an electrical signal modulated to encode data in the signal. In some aspects, a first level of the signal (e.g., a first voltage level, or a first current level, for example a high voltage level, or a high current level) may be associated with a logic "1", and a second level of the signal (e.g., a second voltage level, or a second current level, for example a low voltage level, or a low current level) may be associated with a logic "0". It is however understood that the definition of logic "1" and logic "0" and of the type of signal modulation associated thereto may be arbitrary (e.g., other examples of modulation may include the signal amplitude, the signal frequency, the signal period, etc.). A level of a signal may also be referred to herein as a state of the signal. A high voltage level or a high current level of a signal may be understood as a signal having a voltage above a voltage threshold or a current above a current threshold, respectively. A low voltage level or a low current level of a signal may be understood as a signal having a voltage below a voltage threshold or a current below a current threshold, respectively. Only as a numerical example, a high voltage level may be 1 V and a low voltage level may be 0 V. Only as a numerical example, a high current level may be 500 mA and a low current level may be 0 mA.

As used herein, a signal that is "indicative of" or "representing" a value or other information (e.g., an instruction) may be a digital or analog signal that encodes or otherwise communicates the value or other information in a manner that can be decoded by and/or cause a responsive action in a component receiving the signal (e.g., in a slave device receiving instructions from a host device, or in a host device receiving data from a slave device).

The term "reference voltage" may be used herein to denote a base voltage for a device (e.g., for a circuit). With respect to a device, the reference voltage may be also referred to as ground (GND) voltage, ground potential, virtual ground voltage, or zero volts (0 V).

The terms "processor" or "controller" or "processing circuitry" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory.

The term "terminal" may be used herein to describe a location (e.g., a point) or structure of a device or of an element of the device at which a signal (e.g., an analog signal, for example a current or a voltage) may be provided and/or to which another device or element may be connected. Illustratively, a terminal may be a location or a structure that is electrically conductively connected with the device or the element (e.g., with a host device, with a slave device, with a single-wire connection, and the like). A terminal may also be referred to herein as port, pin, contact, or contact point.

In the context of the present description, the term "operable" in relation to a device (e.g., a circuit) may be used to describe that the device may carry out a function independently (e.g., without external instructions) or under control of another device (e.g., another module or circuit). A first device operable to carry out a function may be capable of carrying out the function completely by itself and/or may be capable of being operated by a second device to carry out the function. The second device may be configured to operate the first device, e.g. to provide instructions to the first device to carry out the function. Illustratively, a device operable to carry out a function, with respect to a device configured to carry out the function, may provide the possibility of being controlled by another device for carrying out the function.

Various aspects of the present description may be based on the realization that in a conventional host device-slave device system, the power provided to the slave device may be insufficient to support various types of operations that may be implemented in a slave device, due to the increasing trend to use lower voltage for supplying a host device.

Various aspects may be related to a device including adaptive power control (illustratively, to an adapted slave device, e.g. an adapted single-wire device). The adaptive power control may ensure that the device has at its disposal sufficient power to carry out a desired operation or a full range of desired operations. Various aspects may be related to a device configured to adapt an amount of received power (in some aspects, an amount of power drawn via a single-wire connection) depending on an operation carried out or to be carried out (e.g., depending on an energy consumption associated with the operation).

FIG. 1 shows schematically a single-wire system 100 including a host device 102 (a master device) and a single-wire device 104 (a slave device) according to various aspects. Illustratively, the host device 102 and the single-wire device 104 may form a single-wire interface, e.g. the host device 102 and the single-wire device 104 may be connected to one another via a single-wire connection 106. The single-wire device 104, may be configured to receive data and power via the single-wire connection 106, as described in further detail below.

In some aspects, the host device 102 may include a substrate 108. Illustratively, the host device 102 may be disposed on the substrate 108 (e.g., mounted on or integrated in the substrate 108). In some aspects, the substrate 108 may be a board (also referred to as single-wire host board), e.g. a printed circuit board. In some aspects, the single-wire device 104 may include a substrate 110. Illustratively, the single-wire device 104 may be disposed on the substrate 110 (e.g., mounted on or integrated in the substrate 110). In some aspects, the substrate 110 may be a board (also referred to as single-wire device board), e.g. a printed circuit board. The single-wire connection 106 may be understood to include respective conductive elements (e.g., conductive lines) on the substrate 108 of the host device 102 (e.g., the conductive element 106*h*) and on the substrate 110 of the single-wire device 104 (e.g., the conductive element 106*d*).

In some aspects, the host device 102 may include one or more terminals, each associated with a respective function or operation. The host device 102 may include a supply terminal 112 at which supply power (e.g., a supply voltage $V_{CC\_HOST}$) is provided, an input/output terminal 114 (e.g., a general purpose input/output (GPIO) terminal), which may be used for communication (e.g., with the single-wire device 104), and a ground terminal 116, at which a reference voltage (e.g., a ground voltage) may be provided. Illustratively, the ground terminal 116 may be connected to a reference voltage source, e.g. to ground.

In some aspects, the single-wire device 104 may include one or more terminals, each associated with a respective function or operation. The single-wire device 104 may include a supply terminal 118 at which supply power is provided to drive the single-wire device 104 (as described in further detail below), an input/output terminal 120 (also referred to as a single-wire terminal), which may be used for communication with the host device 102, and a ground terminal 122, at which a reference voltage (e.g., a ground voltage) may be provided. Illustratively, the ground terminal 122 may be connected to a reference voltage source, e.g. to ground. In some aspects, the ground terminal 122 of the single-wire device 104 and the ground terminal 116 of the host device 102 may be connected to one another, e.g. via a ground connection 124. The ground connection 124 may provide a return path for the current flowing between the host device 102 and the single-wire device 104. The ground connection 124 may include respective conductive elements (e.g., conductive lines) on the substrate 108 of the host device 102 (e.g., the conductive element 124*h*) and on the substrate 110 of the single-wire device 104 (e.g., the conductive element 124*d*).

The host device 102 and the single-wire device 104 may be configured to exchange data via the single-wire connection 106. The host device 102 may be configured to transmit data (e.g., instructions) to the single-wire device 104, and may be configured to receive data (e.g., a response, various types of information) from the single-wire device 104. The single-wire device 104 may be configured to receive data from the host device 102, and to transmit data to the host device 102.

The communication between the host device 102 and the single-wire device 104 may follow any suitable communication protocol, for example a serial communication protocol, such as a single-wire communication protocol. The communication between the host device 102 and the single-wire device 104 may be carried out by modulating the signal (e.g., the signal level, for example the voltage level or the current level) at the single-wire connection 106.

A signal at the single-wire connection 106 may be, in an idle state, at a level defined by a power supply (e.g., a current source or a voltage source) of the host device 102. In some aspects, a voltage at the single-wire connection 106 may be at a voltage level defined by a supply voltage $V_{CC\_HOST}$ of the host device 102 (e.g., a supply voltage provided at the supply terminal 112 of the host device 102). Illustratively, the single-wire connection 106 and a power supply of the host device 102 may be connected to one another, e.g. over a pull-up resistor 126 ($R_{SWI}$). The pull-up resistor 126 may allow the host device 102 and the single-wire device 104 to pull the signal at the single-wire connection 106 low (e.g., from the voltage level defined by $V_{CC\_HOST}$ to the voltage level defined by the reference voltage), for data communication, as described in further detail below.

By way of example, the host device 102 may be configured to encode data in a signal provided at the single-wire device 104 via the single-wire connection 106, for example by pulling the signal low (e.g., to ground) to transmit a logic "0" and by releasing the signal high (e.g., at $V_{CC\_HOST}$) to transmit a logic "1". Illustratively, the host device 102 may be configured to encode data in a signal provided at the single-wire device 104 via the single-wire connection 106 such that a current $I_{OD}$ provided at the input/output terminal 120 of the single-wire device 104 may encode data therein (e.g., associated with the signal levels over time). The single-wire device 104 may be configured to encode data in a signal provided at the host device 104 via the single-wire connection 106, for example by pulling the signal low to transmit a logic "0" and by releasing the signal high to transmit a logic "1", only as an example. Illustratively, the single-wire device 104 may be configured to encode data in a signal provided at the host device 102 via the single-wire connection 106 such that a current provided at the input/output terminal 114 of the host device 102 may encode data therein. The timing of the transmission, e.g. the assigned slots for the transmission, may be governed by the chosen communication protocol.

The single-wire device 104 may be configured to be powered by the signal provided via the single-wire connection 106. The single-wire device 104 may be configured to draw its operating power from the signal provided via the single-wire connection 106 (e.g., from a current $I_{SWI}$ provided via the single-wire connection 106, illustratively provided by the supply voltage $V_{CC\_HOST}$ over the pull-up resistor 126). Where the single-wire connection 106 is used for both communication and power transmission, the single-wire device 104 may be coupled to an external capacitor 128 ($C_{VCC}$). The capacitor 128 ($C_{VCC}$) is configured to store charge for powering the single-wire device 104 when power supply from the host device 102 is not available (e.g. when the single-wire connection 106 is being used for communications, or when the signal at the single-wire connection 106 is pulled low). In some aspects, the power received at the single-wire device 104 may be captured (and stored) in the capacitor 128 ($C_{VCC}$) of the single-wire device 104. The capacitor 128 may be connected to the single-wire connection 106 (and to the supply terminal 118 and to ground) and it may be charged by the power provided via the single-wire connection 106 (e.g., by a current $I_{charge}$ flowing into the capacitor 128). Illustratively, the capacitor 128 may be charged when the signal at the single-wire connection 106 is at the high level. The capacitor 128 may be configured such that the single-wire device 104 may operate (by obtaining operating power from the capacitor 128) even in case the signal at the single-wire connection 106 is pulled low. The powering of the single-wire device 104 by the charge stored in the capacitor 128 may be referred to as indirect power mode.

The single-wire device 104 may include a diode 130 ($D_{VCC}$) configured to prevent a discharge of the capacitor 128. In some aspects, the diode 130 may be a rectifier. The diode 130 may be configured (e.g., disposed) such that it allows a current flow in the direction from the single-wire connection 106 to the capacitor 128 and such that it substantially prevents a current flow in the direction from the capacitor 128 to the single-wire connection 106. Illustratively, the diode 130 may be configured such that the capacitor 128 is not discharged in case the signal at the single-wire connection 106 is pulled low (e.g., by the host device 102, by the single-wire device 104, or by another single-wire device connected to the bus).

Various aspects of the present disclosure may be based on the realization that in a configuration as illustrated in FIG. 1 the power provided at a single-wire device (e.g., at the single-wire device 104) may be insufficient to support various types of operations that may be implemented in a single-wire device (e.g., operations that have a greater energy demand). With advancement in process technology, there is an increasing trend to use lower voltage for supplying a host device (e.g., to use lower supply voltages $V_{CC\_HOST}$). In such applications, the voltage at a supply terminal ($V_{CC}$) of the single-wire device may not be able to support its operation due to the voltage drop at the diode (the $D_{VCC}$ drop). The voltage drop occurring at a diode of the single-wire device (e.g., at the diode 130 of the single-wire device 104) may be too high to ensure that the single-wire device receives enough power to support its operation or its full range of operations. A voltage across a capacitor of the single-wire device may not be sufficient to charge the capacitor at a sufficient level due to the voltage drop at the diode. Illustratively, a current $I_{charge}$ flowing into the capacitor may be insufficient due to a current $I_{VDDP}$ lost due to the voltage drop across the diode.

Various aspects may be related to a device including adaptive power control (illustratively, to an adapted slave device, e.g. an adapted single-wire device). The device described herein may be configured to have an active control over the amount of power drawn via the single-wire connection rather than relying on a passive element such as a diode, thus providing an improved performance. Various aspects may be related to a device configured to adapt a charging of a charge storage element depending on an operation carried out or to be carried out, e.g. a device configured to perform adaptive power control for indirect power mode. Illustratively, various aspects may be related to a device configured to selectively adapt a charging path, e.g. to selectively adapt the resistance of an electrical path via which power is provided at the device depending on an operation carried out or to be carried out (e.g., depending on the current demand of the device). Various aspects may be related to a power switch configured to implement adaptive control based on the current demand of the device for indirect power mode. The configuration described herein may eliminate the need for additional power sources (e.g., charge pumps, which may increase the silicon area) and/or for additional terminals to be connected to additional power sources, thus providing a simpler fabrication process. The power control described herein may allow a lower voltage drop between a communication line and a supply terminal of the device, thus providing greater operating margin.

The device may be described herein, in relation to some aspects, in the context of a single-wire configuration. In some aspects, the device may be configured as a slave device for use in combination with a host device, e.g. in a single-wire interface system. It is however understood that the aspects described herein are not limited to a slave device, or more in general are not limited to a device for use in a single-wire interface system, but may be applied to a variety of configurations and scenarios in which the adaptive power control described herein may provide an improved operation of a device.

Figure 2:
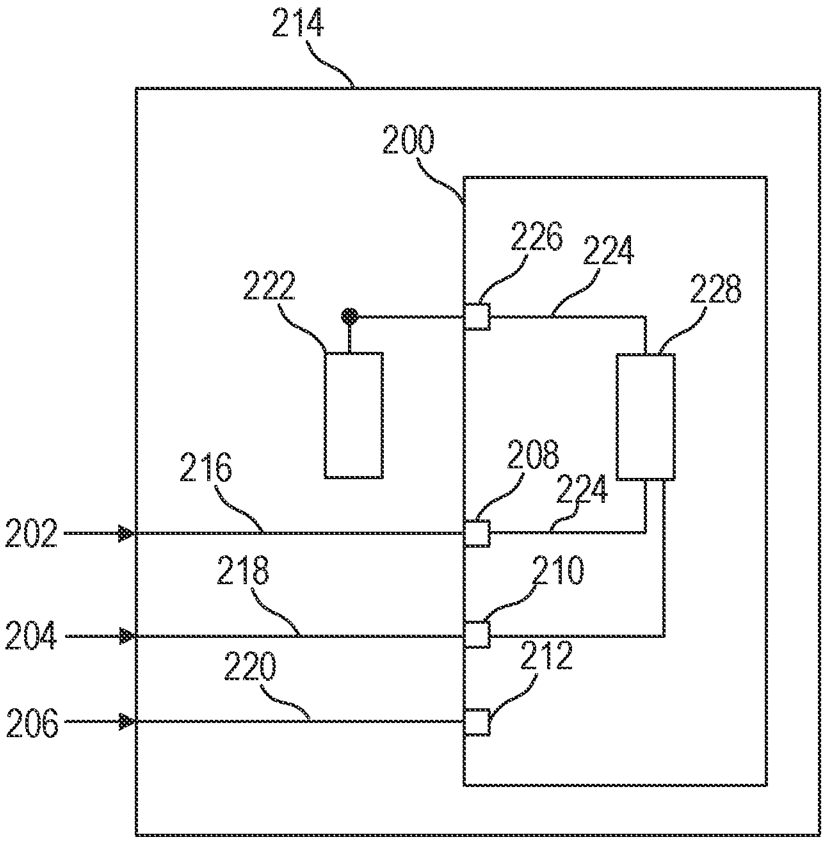
FIG. 2 shows schematically a device, according to various aspects.

FIG. 2 shows schematically a device 200 according to various aspects. In some aspects, the device 200 may be configured as a slave device, e.g. as a single-wire device for use in a single-wire interface system (e.g., in combination with a host device, and optionally with one or more other single-wire devices). It is understood that the configuration of the device 200 illustrated in FIG. 2 is only an example, and that the device 200 may include additional, less, or alternative components as those shown, as described in further detail below.

The device 200 may be configured to receive one or more signals (e.g., a first signal 202, a second signal 204, and a third signal 206, in the exemplary configuration shown in FIG. 2). Each signal may be associated with a different scope or functionality, as described in further detail below. In some aspects, the device 200 may include one or more terminals associated with a respective signal of the one or more signals (e.g., a first terminal 208 associated with the first signal 202, a second terminal 210 associated with the second signal 204, and a third terminal 212 associated with the third signal 206). In some aspects, a terminal may be connected with a respective connecting element (e.g., a respective wire or line) at which the respective signal is provided. A terminal may be configured to receive the associated signal (e.g., the first terminal 208 may be configured to receive the first signal 202, the second terminal 210 may be configured to receive the second signal 204, and the third terminal 212 may be configured to receive the third signal 206). A terminal being configured to receive (or transmit) a signal may be understood as the terminal being connected to the element or elements (e.g., of the device 200) at which that signal is to be provided (or from which that signal is coming). Illustratively, the device 200 may be configured to receive a signal via (or at) the respective terminal (e.g., the first signal 202 via the first terminal 208, the second signal 204 via the second terminal 210, and the third signal 206 via the third terminal 212).

Figure 4:
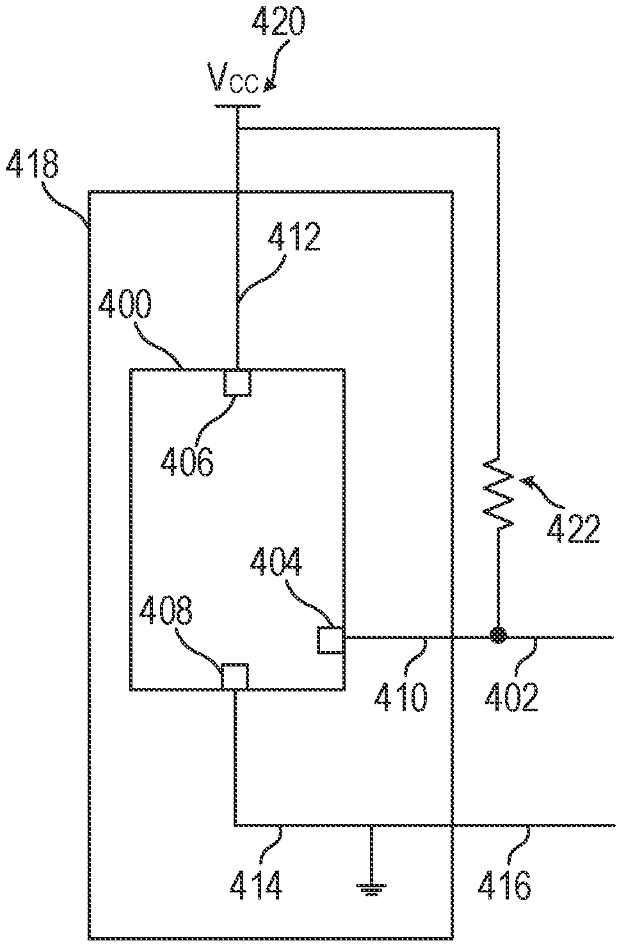
FIG. 4 shows schematically a device, according to various aspects.

In some aspects, the first terminal 208 may be configured to be connected to a second device (e.g., a host device), e.g. a second device external to the device 200 (see also FIG. 4). The first terminal 208 may be configured to be connected to the second device via a single-wire connection. Illustratively, first terminal 208 may be configured to be connected to a single-wire connection carrying the first signal 202. More generally, the first terminal 208 may be configured to be connected to a connection via which communication and power are provided at the device 200. In some aspects, the first signal 202 may be a signal at a single-wire connection (see also FIG. 5).

In some aspects, the device 200 may include a substrate 214. The device 200 may be disposed on the substrate 214, e.g. the device 214 may be mounted on or integrated in the substrate 214. The substrate 214 may be, in some aspects, a board (also referred to herein as device board), for example a printed circuit board. In some aspects, the substrate 214 may include one or more conductive elements (e.g., one or more conductive traces or lines), associated with a respective one of the one or more signals. In the exemplary configuration in FIG. 2, the substrate 214 may include a first conductive element 216 associated with the first signal 202 (e.g., connected to the first terminal 208), a second conductive element 218 associated with the second signal 204 (e.g., connected to the second terminal 210), and a third conductive element 220 associated with the third signal 206 (e.g., connected to the third terminal 212). In some aspects, a conductive element may be connected to a respective port at which the associated signal may be provided (e.g., a respective input port or connection port, not shown in FIG. 2).

At least one signal (e.g., the first signal 202) may be configured to provide (both) power and data to the device 200. Illustratively, the device 200 may receive data via the at least one signal, and may be powered via the at least one signal. In some aspects, the at least one signal may include a current or a voltage. For instance, the device 200 may be configured to receive data in form of a modulation of the received (first) signal (e.g., of the received current or voltage), and may be configured to draw operating power from the received (first) signal. In some aspects, the at least one signal may be a signal provided over a single-wire connection (e.g., between the device 200 and a host device).

In some aspects, the device 200 may include a charge storage element 222. The charge storage element 222 may be configured to be charged by the power provided by the received signal configured to provide power and data to the device 200, e.g. by the received first signal 202. Illustratively, the charge storage element 222 may be configured to store therein charge provided by the received first signal 202 (e.g., charge provided by a current associated with the received signal flowing into the charge storage element 222). In some aspects, the charge storage element 222 and the terminal at which the signal is received may be connected to one another (e.g., the charge storage element 222 and the first terminal 208 may be connected to one another). Illustratively, the device 200 may include an electrical path 224 connecting the terminal at which the signal configured to provide power and data to the device 200 is (or should be) received, e.g. the first terminal 208, and the charge storage element 222 with one another. The electrical path 224 may in some aspects, include a plurality of portions. For instance, as described in further detail below, the electrical path 224 may include a plurality of possible paths between the first terminal 208 and the charge storage element 222. In some aspects, the charge storage element 222 may include a capacitor (see also FIG. 6A). In some aspects, the charge storage element 222 may be connected to ground (see also FIG. 6A).

The charge storage element 222 may be configured to provide operating power to the device 200, e.g. when power supply from an external source such as a host device is not available. This may occur for instance when the received first signal 202 is at a low level (e.g., in case the received first signal 202 is pulled low, for example to ground). Illustratively, the charge storage element 222 may be configured to store charge to be used for an operation of the device 200 in an indirect power mode. In some aspects, the charge storage element 222 may be configured to provide power (e.g., via discharging) to one or more processors or to a processing circuitry of the device 200, for example via a terminal 226 (e.g., a supply terminal) associated with the charge storage element 222. The supply terminal 226 may be connected to one or more processors of the device 200 (not shown in FIG. 2), e.g. configured to implement one or more operations implemented in the device 200.

In some aspects, the device 200 may include a charging control circuit 228 (also referred to herein as switching circuit or power control circuit). The charging control circuit 228 may be configured to control a charging of the charge storage element 222 by the power provided by the received signal configured to provide power and data to the device 200, e.g. by the power provided by the received first signal 202. Illustratively, the charging control circuit 228 may be configured to control the amount of power (in some aspects, the amount of current, or the amount of voltage) being provided at the charge storage element 222 by the received first signal 202. In some aspects, the charging control circuit 228 may be configured to control the speed at which the charge storage element 222 is charged by the power provided by the received first signal 202. The charging control circuit 228 may be configured to adaptively (and actively) control the charging of the charge storage element 222 depending on (in some aspects, in accordance with) the received first signal 202, as described in further detail below.

The charging control circuit 228 may be configured to control the charging of the charge storage element 222 by the power provided by the received first signal 202 based on the data provided by the received first signal 202. In some aspects, the device 200 may be configured to interpret (e.g., to decode) the data provided by the received first signal 202, and the charging control circuit 228 may be configured to control the charging of the charge storage element 222 depending on the data (e.g., depending on one or more instructions that were encoded in the data). By way of example, the device 200 may include one or more processors (e.g., a control module, e.g. a digital core) configured to decode the received first signal 202 to determine one or more instructions to be executed by the device 200. The charging control circuit 228 may receive corresponding instructions from the one or more processors based on the decoded data, and control the charging of the charge storage element 222 accordingly.

In some aspects, the charging control circuit 228 may be configured to control the charging of the charge storage element 222 in accordance with a level of the received first signal 202 (e.g., with a current level or voltage level of the received first signal), as described in further detail below (for example, in relation to FIG. 3B).

The adaptive control described herein may be based on a level of the received first signal 202 and/or on data (e.g., instructions) encoded in the received first signal 202.

In some aspects, the data provided by the received first signal 202 may define an operation of the device 202. The data provided by the received first signal 202 may instruct an operation that the device 202 should carry out (e.g., a transmission of data, an authentication operation, non-volatile memory write, and the like). Illustratively, the data provided by the received first signal 202 may encode therein one or more instructions defining an operation of the device 200 (e.g., one or more instructions associated with an operation of the device 200).

In some aspects, the charging control circuit 228 may be configured to control the charging of the charge storage element 222 depending on the operation defined by the data provided by the received first signal 202. The charging control circuit 228 may be configured to control the charging of the charge storage element 222 based on an expected (or known) power consumption associated with the operation defined by the data. By way of example, each operation that may be carried out by the device 200 may be associated with a respective known power consumption, and the charging control circuit 228 may be configured to control the charging of the charge storage element 222 according to the respectively associated power consumption. The charging control circuit 228 may be configured to control the charging of the charge storage element 222 based on a level of the expected power consumption, e.g. based on whether the expected power consumption exceeds a predefined threshold. The predefined threshold may be selected depending on the functionalities implemented by the device 200 and/or on the configuration of the charge storage element 222.

In some aspects, the charging control circuit 228 may be configured to control an amount of power (e.g., an amount of current or an amount of voltage) that the charge storage element 222 receives from the received first signal 202. The charging control circuit 228 may be configured to control an amount of power drawn from the received first signal 202 and delivered to the charge storage element 222. The charging control circuit 228 may be configured to control the amount of power received at the charge storage element 222 based on the data provided by the received first signal 202, e.g. based on the operation the device 200 is to perform as indicated by the data in the received signal and expected power consumption for such operation, e.g. based on whether the expected power consumption exceeds the predefined threshold. The charging control circuit 228 may be configured to control the charging of the charge storage element 222 such that the charge storage element 222 receives a first power from the received first signal 202 in case the expected power consumption of the device 200 is above a predefined threshold. The charging control circuit 228 may be configured to control the charging of the charge storage element 222 such that the charge storage element 222 receives a second power (e.g., lower than the first power) from the received first signal 202 in case the expected power consumption of the device 200 is below the predefined threshold.

In some aspects, the charging control circuit 228 may be configured to control the amount of power received at the charge storage element 222 in accordance (e.g., in synchronization) with a level of the received first signal 202. The charging control circuit 228 may be configured to control the charging of the charge storage element 222 such that the charge storage element 222 receives a first power from the received first signal 202 in case the received first signal 202 is at a first level (e.g., a high level). The charging control circuit 228 may be configured to control the charging of the charge storage element 222 such that the charge storage element 222 receives a second power (e.g., lower than the first power) from the received first signal 202 in case the received first signal 202 is at a second level (e.g., opposite the first level, e.g. a low level).

In some aspects, the charging control circuit 228 may be configured to control an electrical resistance of an electrical path 224 via which the charge storage element 222 receives the power provided by the received first signal 202, illustratively an electrical path 224 via which the charge storage element 222 may be charged by the received first signal 202. In some aspects, the charging control circuit 228 may be configured to control an electrical resistance of the electrical path 224 between the charge storage element 222 and the terminal at which the first signal 202 is received, e.g. between the charge storage element 222 and the first terminal 208. The charging control circuit 228 may be configured to control the electrical resistance of the electrical path 224 based on the data provided by the received first signal 202, e.g. based on the expected power consumption of the device 200 (illustratively, the expected power consumption associated with the operation defined by the data), e.g. based on whether the expected power consumption exceeds the predefined threshold. The charging control circuit 228 may be configured to control the electrical resistance of the electrical path 224 such that a first resistance of the electrical path 224 is provided in case an expected power consumption of the device 200 is above the predefined threshold. The charging control circuit 228 may be configured to control the electrical resistance of the electrical path 224 such that a second resistance (greater than the first resistance) of the electrical path 224 is provided in case an expected power consumption of the device 200 is below the predefined threshold.

In some aspects, the charging control circuit 228 may be configured to control the electrical resistance of the electrical path 224 in accordance (e.g., in synchronization) with a level of the received first signal 202. The charging control circuit 228 may be configured to control the electrical resistance of the electrical path 224 such that a first resistance of the electrical path 224 is provided in case the received first signal 202 is at a first level (e.g., a high level). The charging control circuit 228 may be configured to control the electrical resistance of the electrical path 224 such that a second resistance (greater than the first resistance) of the electrical path 224 is provided in case the received first signal 202 is at a second level (e.g., opposite the first level, e.g. a low level). Illustratively, the low resistance may facilitate a charging of the charge storage element 222, and the high resistance may prevent a discharging of the charge storage element 222 when the first signal 202 is pulled low.

In some aspects, at least one of the received signals, e.g. the second signal 204, may include a configuration signal. The second signal 204 may be modulated to encode configuration information therein. A terminal associated with the configuration signal, e.g. the second terminal 210 in the configuration illustrated in FIG. 2 (and the associated second conductive element 218), may be configured to receive the configuration signal. In some aspects, the configuration signal may be indicative of a configuration of the device 200, e.g. of a configuration of an operation of the device 200 (e.g., of the operation defined by the data provided by the first signal 202).

In some aspects, the charging control circuit 228 may be configured to control the charging of the charge storage element 222 based on the configuration signal, e.g. by using the configuration signal to determine an amount of power to be delivered to the charge storage element. The charging control circuit 228 may be configured to estimate an expected power consumption associated with an operation of the device 200 based on the configuration signal, e.g. based on the configuration indicated by the configuration signal, and to control accordingly the charging of the charge storage element 222. In some aspects, the one or more processors of the device 200 may be configured to estimate an expected power consumption associated with an operation of the device 200 based on the configuration signal, and to deliver corresponding information to the charging control circuit 228.

In some aspects, the configuration signal may be indicative of an instruction to select one of an indirect power mode and a direct power mode. In the indirect power mode, the device 200 may be configured to derive its operating power exclusively from the charge storage element 222, illustratively from the charge stored in the charge storage element 222 (which is charged by the power provided by the received first signal 202). In the direct power mode, the device 200 may be configured to derive its operating power directly from a power supply (e.g., from a current source or a voltage source). Illustratively, in the direct power mode, the device 200 may use the received power (e.g., received via the first signal 202, or received via another power supply) exclusively for performing one of its functions without charging the charge storage element 222. In some aspects, the charging control circuit 228 may be configured to control the charging of the charge storage element 222 (only) in the indirect power mode. The charging control circuit 228 may be configured to carry out (e.g., to enable) the charging control described above in case the configuration signal indicates that the indirect power mode is to be selected. The charging control circuit 228 may be configured to disable the charging control described above in case the configuration signal indicates that the direct power mode is to be selected.

In some aspects, at least one of the received signals, e.g. the third signal 206, may include a reference signal. By way of example, the third signal 206 may include a reference voltage, e.g. a ground voltage. A terminal associated with the reference signal, e.g. the third terminal 212 in the configuration illustrated in FIG. 2 (and the associated third conductive element 220), may be configured to receive a reference voltage, e.g. it may be connected to ground. In some aspects, the device 200 (e.g., the terminal associated with the reference signal) may be connected to a common ground as a second device (e.g., a host device) with which the device 200 communicates, see for example FIG. 4. Illustratively, the device 200 (e.g., the third terminal 212) may be connected to a return path for a current flowing between the device 200 and the second device.

It is understood that the device 200 may also include additional or alternative components with respect to those shown in FIG. 2. As an example, the device 200 may include a memory, e.g. a non-volatile memory, for example for storing authentication information and/or for storing a unique identifier of the device 200 (e.g., a 64-bit identifier uniquely associated with the device 200). As another example, the device 200 may include an internal oscillator configured to control the timing of the operation of the device 200 (and of the charging control circuit 228). The internal oscillator may be synchronized, for example, with a falling edge of the received first signal 202 (e.g., with a falling edge of the signal at a single-wire connection between the device 200 and a host device). As a further example, the device 200 may include electrostatic discharge (ESD) protection circuitry.

In some aspects, the device 200 may be configured to transmit data (e.g., various type of information, such as authentication information, monitoring information, and the like). The device 200 may be configured to transmit data by modulating the first signal 202, e.g. by modulating a level (e.g., a voltage level) of the first signal 202. In some aspects, the device 200 (e.g., one or more processors of the device 200) may be configured to pull the first signal 202 low (illustratively, at a low voltage level, for example at the ground voltage) to transmit a logic "0" to a second device monitoring the signal, e.g. to a host device connected to a same single-wire connection as the device 200. The device 200 may be configured to release (or to keep) the first signal 202 high (e.g., to a high voltage level, for example to a level of a supply voltage of a host device), to transmit a logic "1" to the second device. It is however understood that the data transmission strategy described herein is only an example, and other possibilities may be implemented for transmitting data, e.g. other possible modulation schemes for encoding data in a signal. Pulling the first signal 202 low may be understood as pulling low the level of a signal over a connection at which the device 200 is connected (e.g., the signal over a single-wire connection between the device 200 and a host device).

Various possible implementations of a charging control circuit (e.g., of the charging control circuit 200) will now be described in further detail below, for example in relation to the charging control circuits 300*a*, 300*b*, 300*c*, 300*d* illustrated in FIG. 3A to FIG. 3D. In the FIG. 3A to FIG. 3D some of the components of a device (e.g., of the device 200 illustrated in FIG. 2) are represented for facilitating the understanding of the arrangement of the respective charging control circuit in the device. It is however understood that other components of the device (e.g., other components illustrated in FIG. 2, or additional or alternative components) may be present.

In the FIG. 3A to FIG. 3D a charging control circuit 300*a*, 300*b*, 300*c*, 300*d* is described. The charging control circuit 300*a*, 300*b*, 300*c*, 300*d* may be configured as the charging control circuit 228 described in relation to FIG. 2 Illustratively, the charging control circuit 300*a*, 300*b*, 300*c*, 300*d* may be an exemplary implementation of the charging control circuit 228 described in relation to FIG. 2. It is however understood that other implementations of the aspects described in relation to the charging control circuit 228 may be possible. It is also understood that the aspects described in relation to the charging control circuit 300*a*, 300*b*, 300*c*, 300*d* may be combined with one another.

Figure 3A:
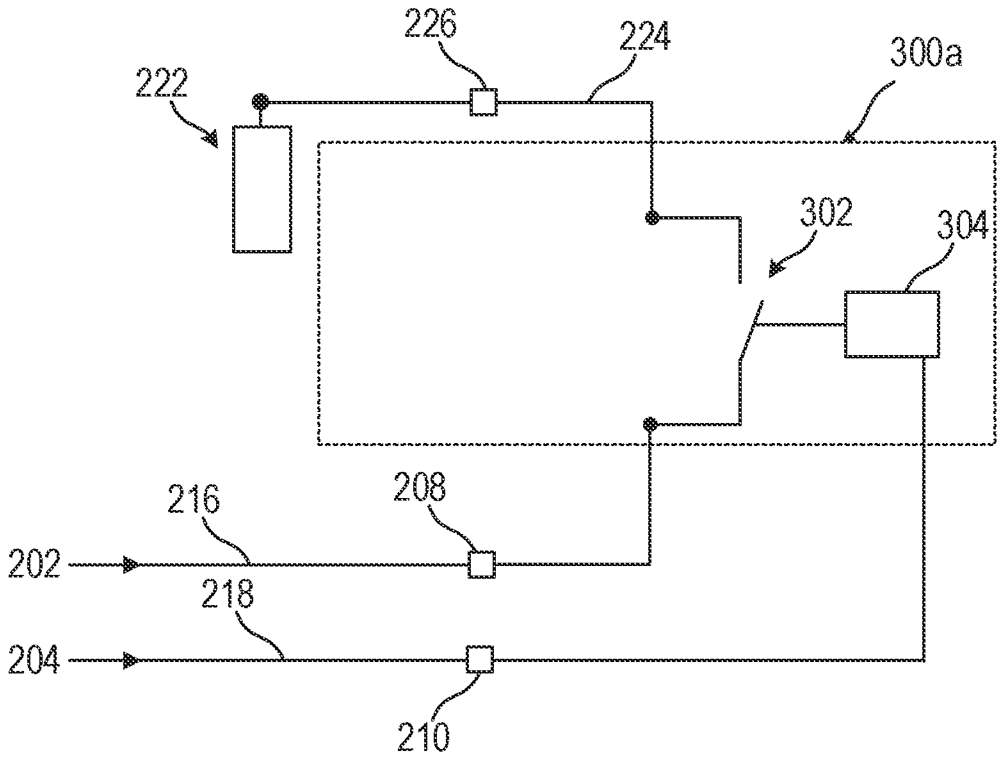
FIG. 3A to FIG. 3D each show schematically a charging control circuit, according to various aspects.

FIG. 3A shows schematically a charging control circuit 300*a* according to various aspects. The charging control circuit 300*a* may include a first switch 302 (also referred to herein as main switch or main power switch). The first switch 302 may be configured to provide a first electrical path via which a charge storage element (e.g., the charge storage element 222) may be charged. Illustratively, the first switch 302 may be configured to provide a first electrical path via which a signal configured to provide data and power to the device (e.g., the first signal 202) may be provided at the charge storage element 222. In some aspects, the first switch 302 may be connected in series with the charge storage element 222. The first switch 302 may be configured to provide (e.g., to connect) the first electrical path in case the first switch 302 is activated (in other words, closed), and to disconnect the first electrical path in case the first switch 302 is de-activated (in other words, open). It is however understood that other configurations of the first switch 302 for connecting or disconnecting the first electrical path may be provided.

In some aspects, the first electrical path may have a first resistance, for example the first electrical path may be a low resistance path (e.g., having resistance lower than a second electrical path described below in relation to FIG. 3B, and/or having a resistance lower than an electrical path in which a decoupling element is present, as described in relation to FIG. 3C). By way of example, the first electrical path may have a resistance lower than 2Ω, for example lower than 1Ω or lower than 0.5Ω. The first electrical path may provide a low resistance connection to ensure fast charging of the charge storage element 222. The first electrical path may be understood, in some aspects, as a fast charging path.

In some aspects, the first electrical path may be configured to provide a low(er) voltage drop (e.g., lower than the voltage drop provided by a second electrical path described below in relation to FIG. 3B and/or lower than the voltage drop across the decoupling element described in relation to FIG. 3C) across the terminal at which the signal providing data and power to the device 200 is received, e.g. the first terminal 208, and the terminal associated with power supply of the device, e.g. the supply terminal 226. This may provide greater operating margin for the device operation.

Figure 3B:
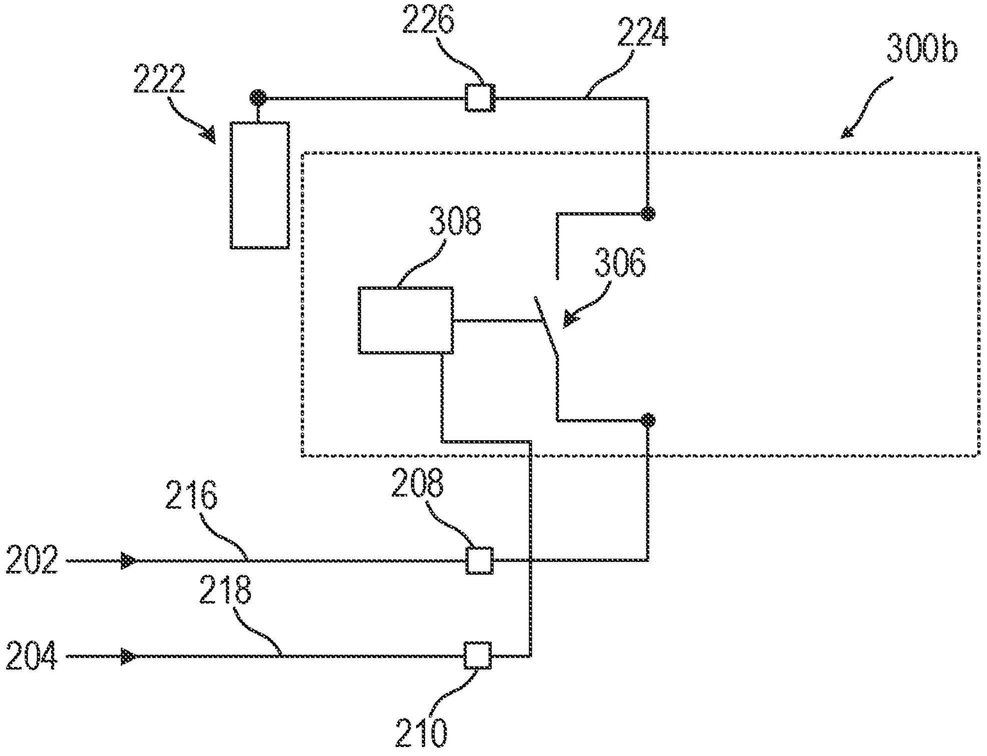

In some aspects, the first switch 302 may be configured to sustain a high current (e.g., greater with respect to the current that may be sustained by a second switch described in relation to FIG. 3B). The first switch 302 may be a strong switch, to support the fast charging of the charge storage element 222 (and to support operations with high energy demand). In some aspects, the first switch 302 may have an area in the range from about 1000 $\mu m^2$ to about 6000 $\mu m^2$, for example an area of about 4800 $\mu m^2$. The first switch 302 may have a resistance (e.g., an ON resistance) in the range from about 0.1Ω to about 2Ω, for example a resistance of about 0.84Ω. The area of the first switch 302 may be greater than an area of a second switch, described below, to sustain the greater current flowing through the first electrical path. The resistance of the first switch 302 may be lower than a resistance of the second switch to allow more current to flow through the first electrical path. In some aspects, the first switch 302 may include a transistor, e.g. a field-effect transistor, such as a metal-oxide-semiconductor field-effect transistor.

In some aspects, the charging control circuit 300*a* may be configured to select the first electrical path (that is, to activate the first switch 302) in case a greater power demand (e.g., a greater current demand) is expected, e.g. in case the data provided by the first signal 202 indicate an operation with an expected power consumption above the predefined threshold.

In some aspects, the charging control circuit 300*a* may include a first controller 304 (also referred to herein as main controller) configured to control the first switch 302. The first controller 304 may be configured to control (e.g., to activate or de-activate) the first switch 302 based on the data provided by the received first signal 202, e.g. based on the expected power consumption of an operation defined by the data.

In some aspects, the first controller 304 may be configured to activate the first switch 302 to connect the first electrical path in case the expected power consumption of the operation defined by the data provided by the received first signal 202 is above a predefined threshold. As discussed earlier, the first electrical path may have a lower resistance compared to the second electrical path described below in relation to FIG. 3B thereby increasing the charging rate of the charge storage element 222 and allowing the device 200 to meet the demands of operations with expected power consumption exceeding the predefined threshold. The first controller 304 may be configured to de-activate the first switch 302 to disconnect (or to maintain disconnected) the first electrical path in case the expected power consumption of the operation defined by the data provided by the received first signal 202 is below the predefined threshold.

In some aspects, the first controller 304 may be configured to control the first switch 302 based on a (known) duration of the operation carried out or to be carried out by the device 200, e.g. of the operation defined by the data provided by the received first signal 202. The first controller 304 may be configured to de-activate the first switch 302 to disconnect the first electrical path after completion of the operation defined by the data provided by the received first signal 202 (and to maintain the first switch 302 activated for the duration of the operation). The duration of the operation carried out by the device 200 may be timed, for example, by a local oscillator of the device 200.

In some aspects, the first switch 302 may be configured (e.g., dimensioned) such that there is a delayed response to an instruction provided by the first controller 304. The first switch 302 (and the remaining portion of the circuit) may be configured such that a delay is present between an instruction to activate or de-activate the first switch 302 and the actual activation or de-activation of the switch. The delay may be determined by the dimensioning of the first switch 302 and/or by the overall configuration of the charging control circuit 300. By way of example, the delay may be in the range from about 10 μs to about 100 μs, for example in the range from about 1 μs to about 20 μs. In some aspects, the delayed response may provide that the first switch 302 is de-activated to disconnect the first electrical path with a delay with respect to the end of a power-up phase of the device 200, described in further detail below in relation to FIG. 6C. The first controller 304 may be configured to activate the first switch 302 to connect the first electrical path during the power-up phase (to speed up a charging of the charge storage element), and to de-activate the first switch at the end of the power-up phase (to allow data communication to the device 200).

In some aspects, the first controller 304 may be configured to control the first switch 302 in accordance with a configuration signal (e.g., the received second signal 204). The first controller 304 may be configured to carry out the control of the first switch 302 described above in case the configuration signal indicates that the indirect power mode is to be selected. The first controller 304 may be configured to disable the control of the first switch 302 described above (and to leave the first switch 302 open) in case the configuration signal indicates that the direct power mode is to be selected.

FIG. 3B shows schematically a charging control circuit 300*b* according to various aspects. The charging control circuit 300*b* may include a second switch 306 (also referred to herein as weak switch or weak power switch). The second switch 306 may be configured to provide a second electrical path via which a charge storage element (e.g., the charge storage element 222) may be charged. Illustratively, the second switch 306 may be configured to provide a second electrical path via which a signal configured to provide data and power to the device (e.g., the first signal 202) may be provided at the charge storage element 222. In some aspects, the second switch 306 may be connected in series with the charge storage element 222. In some aspects, the second switch 306 and a first switch 302 of the charging control circuit 300*a* (e.g., the first switch 302 described in relation to FIG. 3A) may be connected in parallel with one another. The second switch 306 may be configured to provide (e.g., to connect) the second electrical path in case the second switch 306 is activated (in other words, closed), and to disconnect the second electrical path in case the second switch 306 is de-activated (in other words, open). It is however understood that other configurations of the second switch 306 for connecting or disconnecting the second electrical path may be provided.

Figure 3C:
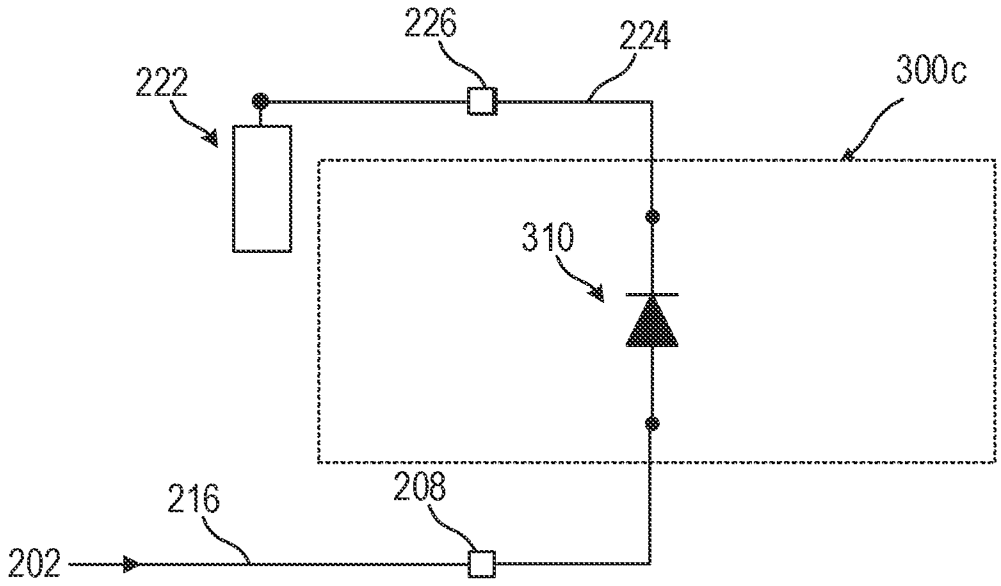

In some aspects, the second electrical path may have a second resistance, e.g. greater than the first resistance, for example the second electrical path may be a high resistance path (e.g., having resistance greater than the first electrical path described in relation to FIG. 3A, but still having a resistance lower than an electrical path in which a decoupling element is present, as described in relation to FIG. 3C). By way of example, the second electrical path may have a resistance greater than 5Ω, for example greater than 10Ω or greater than 50Ω. The second electrical path may provide a high resistance connection to ensure that the received first signal 202 may be pulled low. Illustratively, in case a strong switch is active (e.g., the first switch 302), it may not be possible to pull the received first signal 202 to low (e.g., the signal at a single-line connection). For example, a host device may be configured to commence a transmission of data to the device 200 with a reset pulse where the first signal 202 is pulled to low. This may not be possible if a strong switch is ON (and thus preventing the host device from transmitting data to the device 200). A strong switch may thus be ON to support an operation of the device and may be turned off to (re-)enable data communication after completion of the operation.

The second switch 306 may be configured to provide a (second) electrical path to provide faster charging of the charge storage element 222 compared to a scenario in which only a diode may be present, without preventing the received first signal 202 from being pulled low (thus allowing, for example, a host device to issue a wakeup signal, e.g. a wakeup pulse, by pulling the signal to "0" for a short period of time). The high resistance path may also ensure that the charge storage element 222 is not significantly discharged during a period in which the signal is pulled low and the second switch 306 is still on (that is, in which the second electrical path is still connected), for example during a delay period before the second switch 306 is actually de-activated. In case the second switch 306 was too strong, it may not be possible to pull the signal low in case the switch is active.

In some aspects, the second switch 306 may be configured to sustain a low current (e.g., lower with respect to the current that may be sustained by the first switch 302 described in relation to FIG. 3A). The second switch 306 may be a weak switch that may enable fast(er) charging of the charge storage element 222 (e.g., during a power up phase) without preventing the signal configured to provide data and power to the device from being pulled low. In some aspects, the second switch 306 may have an area in the range from about 10 $\mu m^2$ to about 500 $\mu m^2$, for example an area of about 96 $\mu m^2$. The second switch 306 may have a resistance (e.g., an ON resistance) in the range from about 10Ω to about 100Ω, for example a resistance of about 42Ω. The second switch 306 may be configured (e.g., dimensioned) to sustain (or withstand) a lower current compared to the first switch 302 described in relation to FIG. 3A. In some aspects, the second switch 306 may include a transistor, e.g. a field-effect transistor, such as a metal-oxide-semiconductor field-effect transistor.

A strong switch (e.g., the first switch 302) may differ from a weak switch (e.g., the second switch 306), for example, in the resistance of the switch. A switch may be identified as a strong switch or as a weak switch according to the respective resistance that the switch provides in relation to the resistance of a device coupled to the device including the switch (e.g., in relation to the resistance of a GPIO of a host device). In case the resistance of the switch is much smaller than the resistance of the GPIO of the host (e.g., at least 10 times smaller, or at least 30 times smaller, or at least 50 times smaller), the switch may be considered strong. In some aspects, a resistance of a strong switch (e.g., the first switch 302) may be at least 10 times smaller than a resistance of weak switch (e.g., the second switch 306), for example at least 30 times smaller, or at least 50 times smaller.

In some aspects, the area of the second switch 306 may be smaller than the area of the first switch 302 described in relation to FIG. 3A. By way of example, a ratio of the area of the first switch 302 to the area of the second switch 306 may be in the range from about 10 to about 100, for example about 50.

In some aspects, the charging control circuit 300 may be configured to control the second switch 306 in accordance, e.g. in synchronization, with the received first signal 202 (e.g., in synchronization with a level of the received first signal 202).

In some aspects, the charging control circuit 300 may include a second controller 308 (also referred to herein as weak controller) configured to control the second switch 306. The second controller 308 may be configured to control (e.g., to activate or de-activate) the second switch 306 in accordance with a level of the received first signal 202. The second controller 308 may be configured to activate the second switch 306 to connect the second electrical path in response to the received first signal 202 being at a first level (e.g., at a high level), and to de-activate the second switch 306 to disconnect the second electrical path in response to the received first signal 202 being at a second level (opposite the first level, e.g. at a low level).

In some aspects, the second controller 308 may be configured to activate the second switch 306 in response to the received first signal 202 being at (or transitioning into) a high level (e.g., a high voltage level, e.g. associated with a logic "1"). This may provide that the charge storage element 222 may be (rapidly) charged by the power provided by the received first signal 202 (e.g., compared to a scenario in which only a diode is present). The second controller 308 may be configured to maintain the second switch 306 activated as long as the received first signal 202 is at the first level. This may provide a faster charging of the charge storage element 222. By way of example, the second controller 308 may be configured to activate the second switch 306 during a power up phase of the device 200, as described in further detail below.

In some aspects, the second controller 308 may be configured to de-activate the second switch 306 in response to the received first signal 202 being at (or transitioning into) a low level (e.g., a low voltage level, e.g. associated with a logic "0"). This may provide that a discharge of the charge storage element 222 is prevented (or at least reduced) even in case the received first signal 202 is low. This may also provide that data transmission may be enabled, as described above.

In some aspects, the second controller 308 may be configured to control the second switch 306 in accordance with a configuration signal (e.g., the received second signal 204). The second controller 308 may be configured to carry out the control of the second switch 306 described above in case the configuration signal indicates that the indirect power mode is to be selected. The second controller 308 may be configured to disable the control of the second switch 306 described above (and to leave the second switch 306 open) in case the configuration signal indicates that the direct power mode is to be selected.

In some aspects, the second switch 306 may be configured (e.g., dimensioned) such that there is a delayed response to an instruction provided by the second controller 308. The second switch 306 (and the remaining portion of the circuit) may be configured such that a delay is present between an instruction to activate or de-activate the second switch 306 and the actual activation or de-activation of the switch. The delay may be determined by the dimensioning of the second switch 306 and/or by the overall configuration of the charging control circuit 300. By way of example, the delay may be in the range from about 1 μs to about 10 μs, for example in the range from about 0.1 μs to about 2 μs.

It is understood that the functions described herein in relation to the first controller 304 and the second controller 308 may also be carried out by a single controller (or by more than two controllers) configured to control the first switch 302 and the second switch 306.

FIG. 3C shows schematically a charging control circuit 300*c* according to various aspects. The charging control circuit 300*c* may include a decoupling element 310 (e.g., a diode) configured to prevent a discharging of the charge storage element 222. In some aspects, the decoupling element 310 may be understood as an intrinsic diode of the charging control circuit 300*c* (e.g., of the first switch 302 and/or of the second switch 304, for example a body diode of a transistor). In some aspects, the decoupling element 310 may be understood as an additional element of the charging control circuit 300*c*.

The decoupling element 310 may be configured to provide a third electrical path via which a charge storage element (e.g., the charge storage element 222) may be charged. Illustratively, the decoupling element 310 may be arranged along a third electrical path via which the charge storage element 222 may be charged by a signal configured to provide data and power to the device (e.g., the first signal 202). In some aspects, the decoupling element 310 may be connected in series with the charge storage element 222. In some aspects, the decoupling element 310 may be connected in parallel with a first switch of the charging control circuit 300*c*, or with a second switch of the charging control circuit 300*c* (e.g., the second switch 306), or with both the first and second switch.

The decoupling element 310 may be configured (e.g., arranged) to allow current flow in one direction (e.g., from a terminal at which the signal providing data and power is received, e.g. the first terminal 208, to the charge storage element 222), and to substantially prevent current flow in a second direction (e.g., opposite the first direction, e.g. from the charge storage element 222 to the first terminal 208).

In some aspects, the decoupling element 310 may be configured to provide a charging path for the charge storage element 222 even in case other charging paths to the charge storage element 222 are disconnected (e.g., the first electrical path provided by switch 302 and the second electrical path provided by the second switch 306). Illustratively, the received first signal 202 may be at a high level, but one or more switches (e.g., both the first switch 302 and second switch 306) of the charging control circuit 300*c* may be de-activated due to a delayed response to a respective activation. The decoupling element 310 (and the third electrical path) may provide that the charge storage element 222 is charged also in this case. The decoupling element 310 (and the third electrical path) may also provide that the charge storage element 222 is not discharged in case the first signal 202 is pulled low.

Figure 3D:
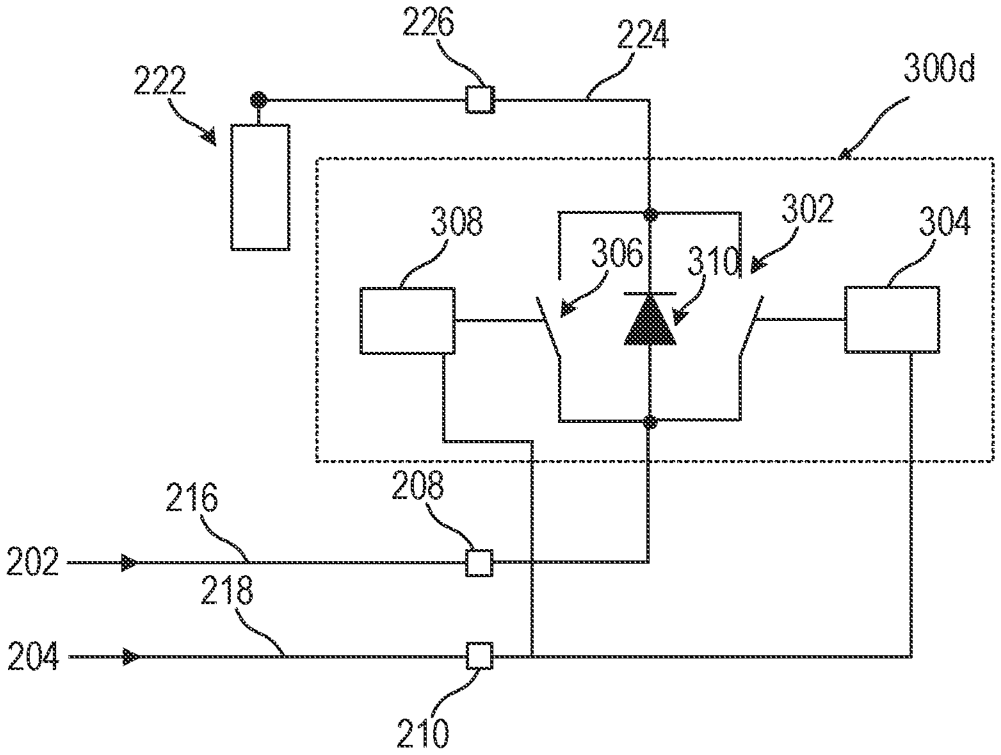

FIG. 3D shows schematically a charging control circuit 300*d* according to various aspects. In FIG. 3D the charging control circuit 300*d* is illustrated including the elements described above in relation to the charging control circuit 300*a*, 300*b*, 300*c* shown in FIG. 3A to FIG. 3C, that is the first switch 302, the first controller 304, the second switch 306, the second controller 308, and the decoupling element 310. In the configuration in FIG. 3D, the power (e.g., the voltage) is fed to the device power supply (e.g., the supply terminal 226) through an internal decoupling element 310 (e.g., an internal diode), and the controlled switch(es) (e.g., the first switch 302 and the second switch 306).

In some aspects, the charging control circuit 300*d* may be configured to provide one or more charging paths for the charge storage element 222 bypassing the decoupling element 310. The charging control circuit 300*d* may be configured to provide an electrical path via which the charge storage element 222 may receive the power provided by the first signal 202 bypassing the decoupling element 310 (e.g., by activating the first switch 302 and/or the second switch 306). Illustratively, the charging control circuit 300*d* may be configured to provide an electrical path between the charge storage element 222 and the first terminal 208 bypassing the decoupling element 310. This may provide a faster charging of the charge storage element 222, and may support an operation of the device 200 with greater energy demand by reducing or eliminating the effect of the voltage drop at the decoupling element 310. Bypassing the decoupling element 310 may be understood as the charging control circuit 300*d* being configured to provide one or more additional charging paths for the charge storage element 222 (e.g., by activating the first switch 302 and/or the second switch 306). Depending on the activation status of the first and second switch (302, 306), the charge storage element 222 may be charged via the decoupling element 310 alone or in combination with the one or more additional charging paths through the first and second switch.

FIG. 4 shows schematically a device 400 according to various aspects. In some aspects, the device 400 may be configured as a host device, e.g. as a (master) device for use in a single-wire interface system (e.g., in combination with one or more slave devices, such as one or more single-wire devices, for example with the device 200 described in relation to FIG. 2). It is understood that the configuration of the device 400 illustrated in FIG. 4 is only an example, and that the device 400 may include additional, less, or alternative components as those shown.

The device 400 may include a single-wire connection 402, and may be configured to be connected to one or more other devices (e.g., one or more slave devices, such as one or more single-wire devices, for example with the device 200 described in relation to FIG. 2) via the single-wire connection 402. The device 400 may be configured to communicate with the one or more other devices via the single-wire connection 402. In the exemplary configuration shown in FIG. 4, the single-wire connection 402 may be understood as a connecting element associated with the device 400, e.g. included in the device 400 or external to the device 400 and to which the device 400 is connected.

The device 400 may include one or more terminals, each associated with a respective functionality. In the exemplary configuration illustrated in FIG. 4, the device 400 may include a first terminal 404 (e.g., a general purpose input/output (GPIO) terminal), which may be used for communication (e.g., with one or more other devices), a second terminal 406 (e.g., a supply terminal), at which supply power (e.g., a supply voltage $V_{CC}$) may be provided (e.g., via a second conductive element 412), and a third terminal 408 (e.g., a ground terminal), at which a reference voltage (e.g., a ground voltage) may be provided. The first terminal 404 and the single-wire connection 402 may be connected with one another (e.g., via a first conductive element 410, which may be understood as being part of the single-wire connection 402). The third terminal 408 may be connected to a reference voltage source (e.g., via a third conductive element 414), e.g. to ground.

In some aspects, the third terminal 408 may be connected to a ground connection 416 (e.g., via the third conductive element 414, which may be understood as being part of the ground connection 416). The ground connection 416 may provide a return path for the current flowing between the device 400 and one or more other devices connected to it.

In some aspects, the device 400 may include a substrate 418. Illustratively, the device 400 may be disposed on the substrate 418 (e.g., mounted on or integrated in the substrate 418). In some aspects, the substrate 418 may be a board (also referred to as single-wire host board), e.g. a printed circuit board.

In some aspects, the device 400 may include a power supply 420 (e.g., a current source or a voltage source), and the single-wire connection 402 may be connected to the power supply 420. In some aspects, the device 400 may include the power supply 420 (e.g., the power supply 420 may be integrated in the device 400, for example in the substrate 418). In some aspects, the power supply 420 may be external to the device 400. In some aspects, the power supply 420 may provide a supply power (e.g., a supply voltage, $V_{CC}$) at the single-wire connection 402. The supply power (e.g., the supply voltage, $V_{CC}$) may be defined by the configuration and the requirements of the device 400. Illustratively, the power supply 420 may be configured to provide a power adapted to the operation of the device 400. The supply power may be provided at the device 400 via the single-wire connection 402 or via an additional conductive element to which the single-wire connection 402 is connected (e.g., via the conductive element 412 and the supply terminal 406). In an idle state, a signal at the single-wire connection 402 may be at a level defined by the supply power (e.g., at a voltage level defined by the supply voltage $V_{CC}$). A voltage level of a signal at the single-wire connection 402 may be understood, in some aspects, as a voltage level of the single-wire connection 402.

In some aspects, the device 400 may include a resistive element 422, e.g. a pull-up resistor, arranged along the path connecting the single-wire connection 402 and the power supply 420 with one another. The resistive element 422 may allow the signal at the single-wire connection 402 to be pulled low (e.g., from the level defined by the power supply to ground). Only as a numerical example, the resistive element 422 may have a resistance in the range from about 50Ω to about 1000Ω.

In some aspects, the device 400 may be configured to transmit data (e.g., instructions). By way of example, the device 400 may be configured to encode data in the signal at the single-wire connection 402 by pulling the signal low (e.g., to ground) to transmit a logic "0" and by releasing the signal high (e.g., at $V_{CC}$) to transmit a logic "1". The timing of the transmission, e.g. the assigned slots for the transmission, may be governed by a communication protocol chosen for communication between the device 400 and one or more other devices.

Figure 5:
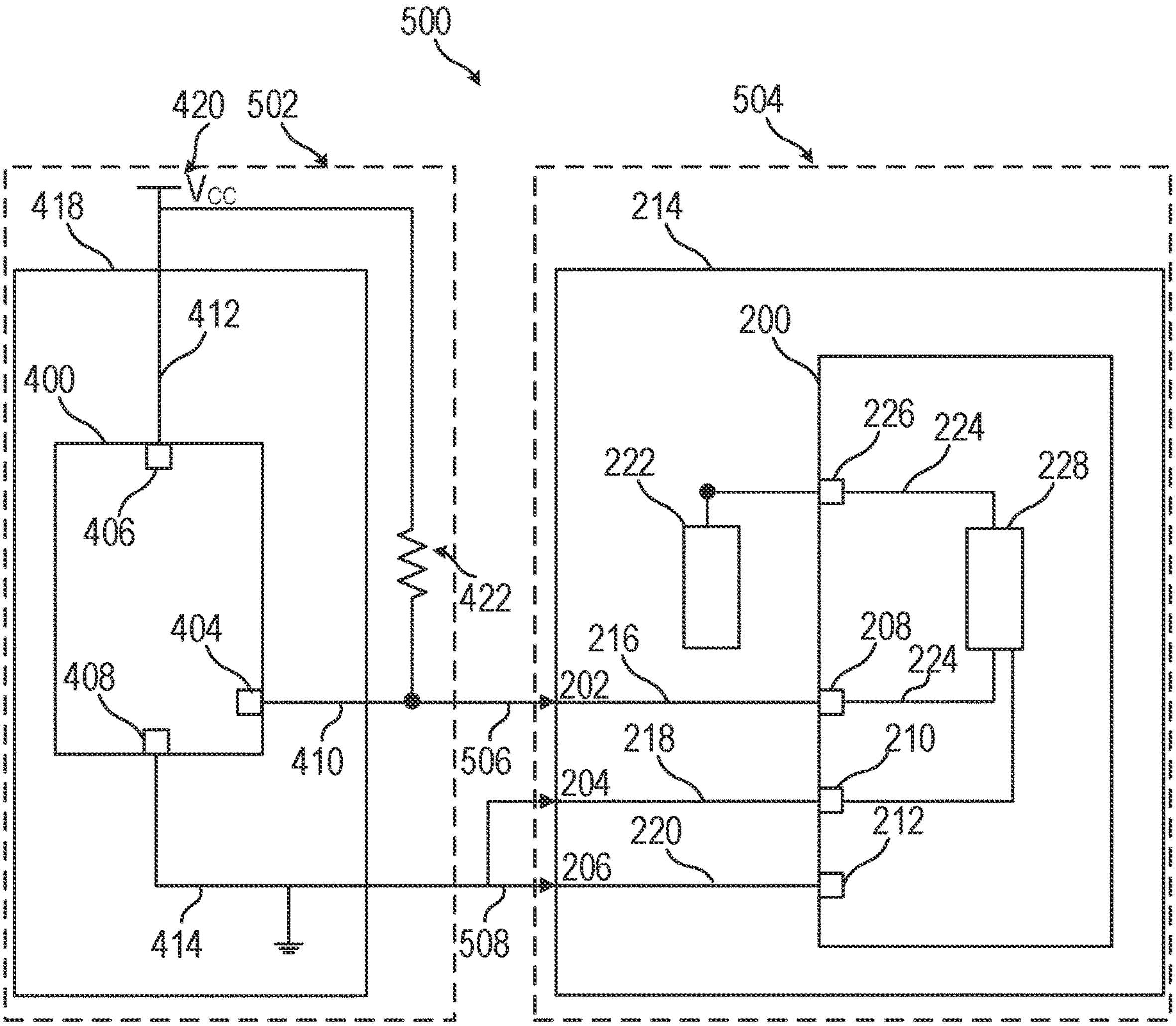
FIG. 5 shows schematically a system including a first device and a second device, according to various aspects.

FIG. 5 shows schematically a system 500 according to various aspects. The system 500 may include a first device 502 and a second device 504. In some aspects, the system 500 may be a single-wire interface system. The first device 502 may be configured as a host (master) device. The second device 504 may be configured as a slave device (e.g., a single-wire slave device). In some aspects, the first device 502 may include or may be configured as the device 400 described in relation to FIG. 4. In some aspects, the second device 504 may include or may be configured as the device 200 described in relation to FIG. 2. The first device 502 and the second device 504 may be connected to one another via a single-wire connection 506. The single-wire connection 506 may be configured as the single-wire connection 402 described in relation to FIG. 4 and as described in relation to FIG. 2. Illustratively, the single-wire connection 506 may be configured to carry a signal configured to provide data and power to the second device 504. The first device 502 and the second device 504 may be connected to one another via a ground connection 508. The ground connection 508 may be configured as the ground connection 416 described in relation to FIG. 4 and as described in relation to FIG. 2.

As described in relation to FIG. 2, the second device 504 may include a charge storage element (e.g., the charge storage element 222) configured to be charged by the power provided by the signal at the single-wire connection 506. The second device 504 may include a charging control circuit (e.g., the charging control circuit 228) configured to control a charging of the charge storage element by the power provided by the signal at the single-wire connection 506 based on the data provided by the signal at the single-wire connection 506.

As described in relation to FIG. 3A to FIG. 3D, the charging control circuit may include a first switch configured to provide a first electrical path for the signal at the single-wire connection 506 to charge the charge storage element. The first switch may be configured to prevent the first device 504 to pull the signal at the single-wire connection 506 to a low level in case the first switch is activated.

As described in relation to FIG. 3A to FIG. 3D, the charging control circuit may include a second switch configured to provide a second electrical path for the signal at the single-wire connection 506 to charge the charge storage element. The second switch may be configured to allow the first device 504 to pull the signal at the single-wire connection 506 to a low level (even) in case the second switch is activated.

Figure 6A:
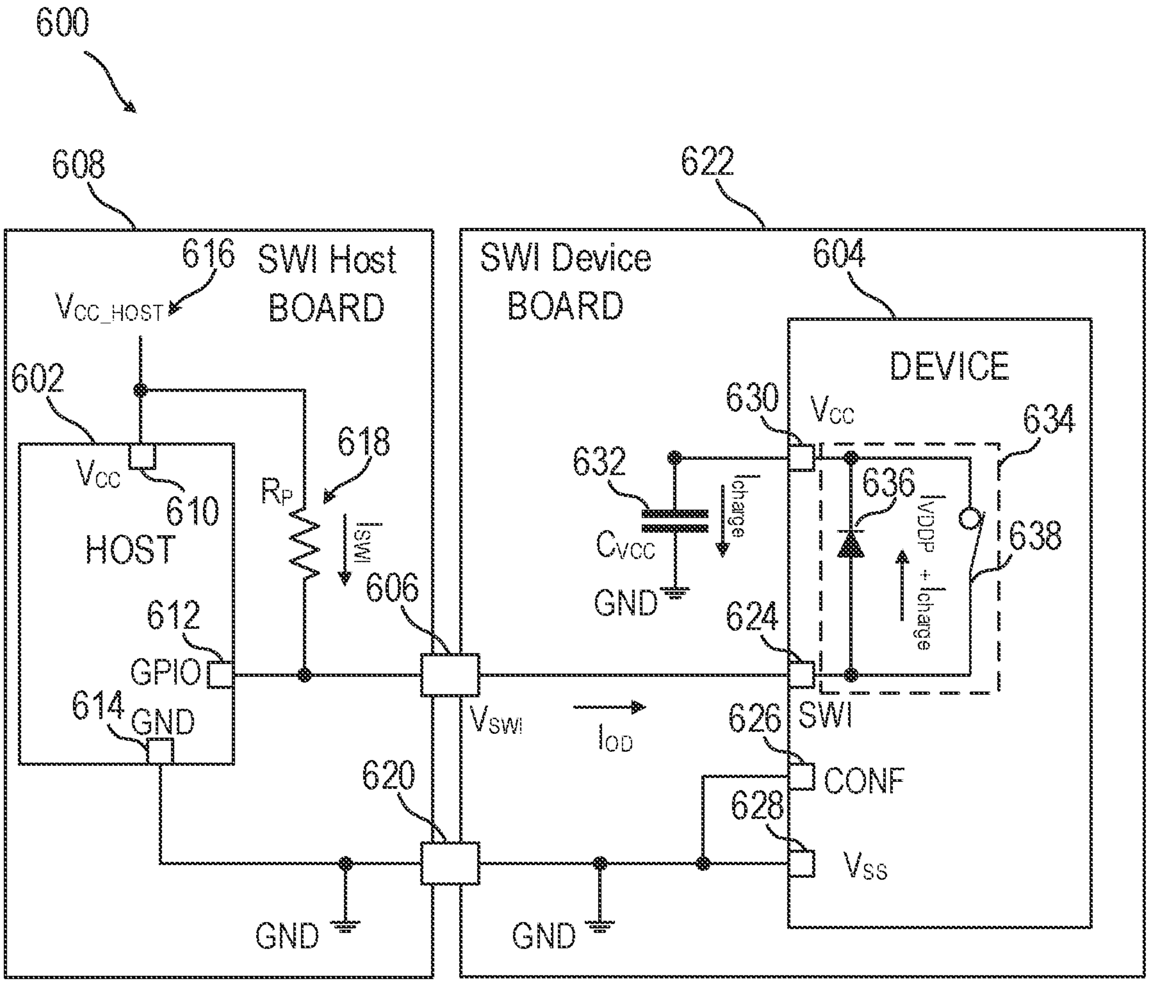
FIG. 6A shows schematically a single-wire system including a host device and a single-wire device, according to various aspects.

FIG. 6A shows schematically a single-wire interface system 600 (in the following referred to as system 600) according to various aspects. The system 600 may include a host (master) device 602 and a single-wire (slave) device 604 connected to one another via a single-wire connection 606 (and via a ground connection 620). Illustratively, the system 600, the host device 602, the single-wire device 604, and the single-wire connection 606 may be an exemplary implementation of the system 500, the first device 502 (e.g., of the device 400), the second device 504 (e.g., of the device 200), and of the single-wire connection 506 (e.g., of the single-wire connection 402).

The host device 602 may include a substrate 608 (e.g., a host board). The host device 602 may include a supply terminal 610, at which a supply voltage $V_{CC\_HOST}$ may be provided, a general purpose input/output terminal 612, which may be used for communication with the single-wire device 604, and a ground terminal 614, at which a reference voltage (e.g., a ground voltage) may be provided.

The host device 602 may include a power supply 616, e.g. a voltage source, configured to provide power (e.g., a supply voltage $V_{CC\_HOST}$) at the host device 602. The single-wire connection 606 and the power supply 616 may be connected to one another over a pull-up resistor 618 ($R_P$). A current $I_{SWI}$ may flow in the pull-up resistor 618 (and provide a voltage $V_{SWI}$ at the single-wire connection 606, e.g. at an input port of the single-wire device 604).

The single-wire device 604 may include a substrate 622 (e.g., a device board). The single-wire device 604 may include a single-wire interface terminal 624, which may be used for communication with the host device 602 (e.g., at which a current $I_{OD}$ may be received), a configuration terminal 626, at which a configuration signal may be provided, a ground terminal 628 at which the reference voltage $V_{SS}$ (e.g., a ground voltage) may be provided, and a supply terminal 630 ($V_{CC}$), at which the operating power for the single-wire device 604 may be provided.

The single-wire device 604 may include a (storage) capacitor 632 ($V_{CC}$) configured to be charged by the power provided by the signal at the single-wire connection 606 (and received at the single-wire terminal 624). Illustratively, the capacitor 632 may be charged by a current $I_{charge}$ flowing into it.

The single-wire device 604 may include a charging control circuit 634 (described in further detail in FIG. 6B) configured to control a charging of the capacitor 632. The charging control circuit 634 may include a diode 636 configured to prevent a discharging of the capacitor 632. The charging control circuit 634 may include one or more switching elements 638 to control the charging of the capacitor 632 (see also FIG. 6B). The charging control circuit 634 may ensure that a current $I_{VDDP}$ associated with a voltage drop across the diode 636 may be reduced.

Figure 6B:
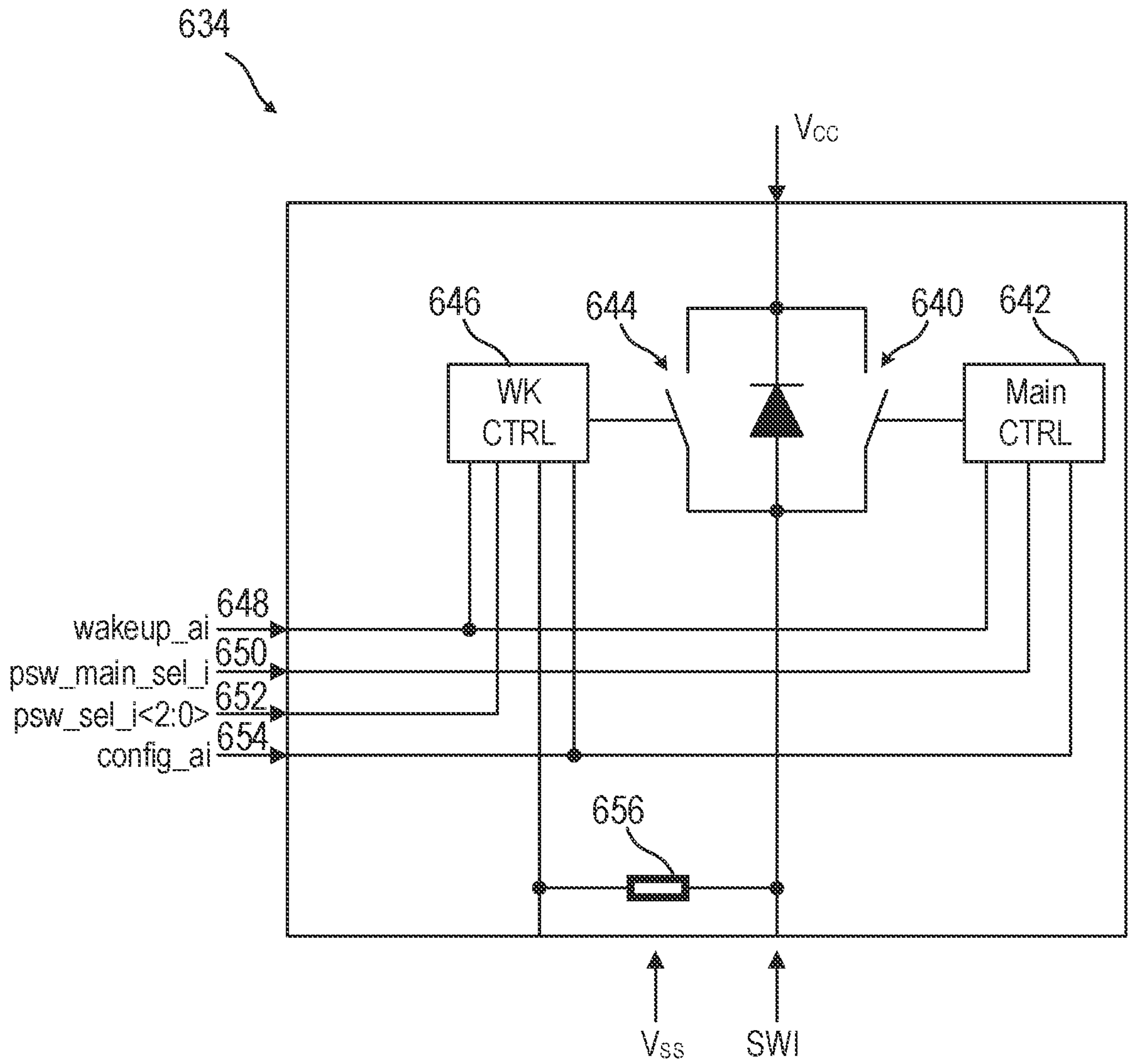
FIG. 6B shows schematically a charging control circuit, according to various aspects.

FIG. 6B shows schematically the charging control circuit 634 according to various aspects. The charging control circuit 634 may be configured as the charging control circuit 228, 300*a*, 300*b*, 300*c*, 300*d* described in relation to FIG. 2 to FIG. 3D. Illustratively, the charging control circuit 634 may be an exemplary implementation of the charging control circuit 228, 300*a*, 300*b*, 300*c*, 300*d* described in relation to FIG. 2 to FIG. 3D. The charging control circuit 634 may include a main switch 640 (also referred to herein as main power switch 640) configured to provide a first electrical path (e.g., a low resistance path) via which the capacitor 632 may be charged by the signal at the single-wire connection 606 (e.g., the signal SWI at the single-wire terminal 624). The charging control circuit 634 may include a main controller 642 configured to control the main switch 640. The charging control circuit 634 may include a weak switch 644 (also referred to herein as weak power switch 644) configured to provide a second electrical path (e.g., a high resistance path) via which the capacitor 632 may be charged by the signal at the single-wire connection 606. The charging control circuit 634 may include a weak controller 646 configured to control the weak switch 644.

The main controller 642 and the weak controller 646 may be configured to control the main switch 640 and the weak switch 644, respectively, based on the data provided by the signal at the single wire connection 606. Illustratively, the main controller 642 and the weak controller 646 may be configured to interpret the instructions encoded in the data provided by the signal at the single wire connection 606. Additionally or alternatively, the single wire device 604 may include one or more processors configured to interpret the instructions encoded in the data provided by the signal at the single wire connection 606 and configured to provide corresponding instructions at the charging control circuit 634.

By way of example, the main controller 642 and the weak controller 646 may be configured to activate the main switch 640 and the weak switch 644 to connect the first electrical path and the second electrical path in response to a wakeup signal 648 (wakeup_ai). The wakeup signal 648 may indicate the beginning of a power up phase. As a further example, the main controller 642 may be configured to activate the main switch 640 to connect the first electrical path in response to an instruction indicating a selection of the main switch 640, e.g. in response to a first selection signal 650 (psw_main_sel_i). As another example, the weak controller 646 may be configured to activate the weak switch 644 to connect the second electrical path in response to an instruction indicating a selection of the weak switch 644, e.g. in response to a second selection signal 652 (psw_sel_i<2.0>). As a further example, the main controller 642 and the weak controller 646 may be configured to enable the control of the main switch 640 and of the weak switch 644 in response to a configuration signal 654 (config_ai) indicating that an indirect power mode is to be selected. The main controller 642 and the weak controller 646 may be configured to disable the control of the main switch 640 and of the weak switch 644 in response to the configuration signal (config_ai) indicating that a direct power mode is to be selected.

The weak controller 646 may be configured to control the weak switch 644 in accordance (e.g., in synchronization) with the signal at the single-wire connection 606, e.g. the signal SWI, which may be provided at the weak controller 646. In some aspects, the signal SWI may be provided at the weak controller 646 over a resistive element 656.

Figure 6C:
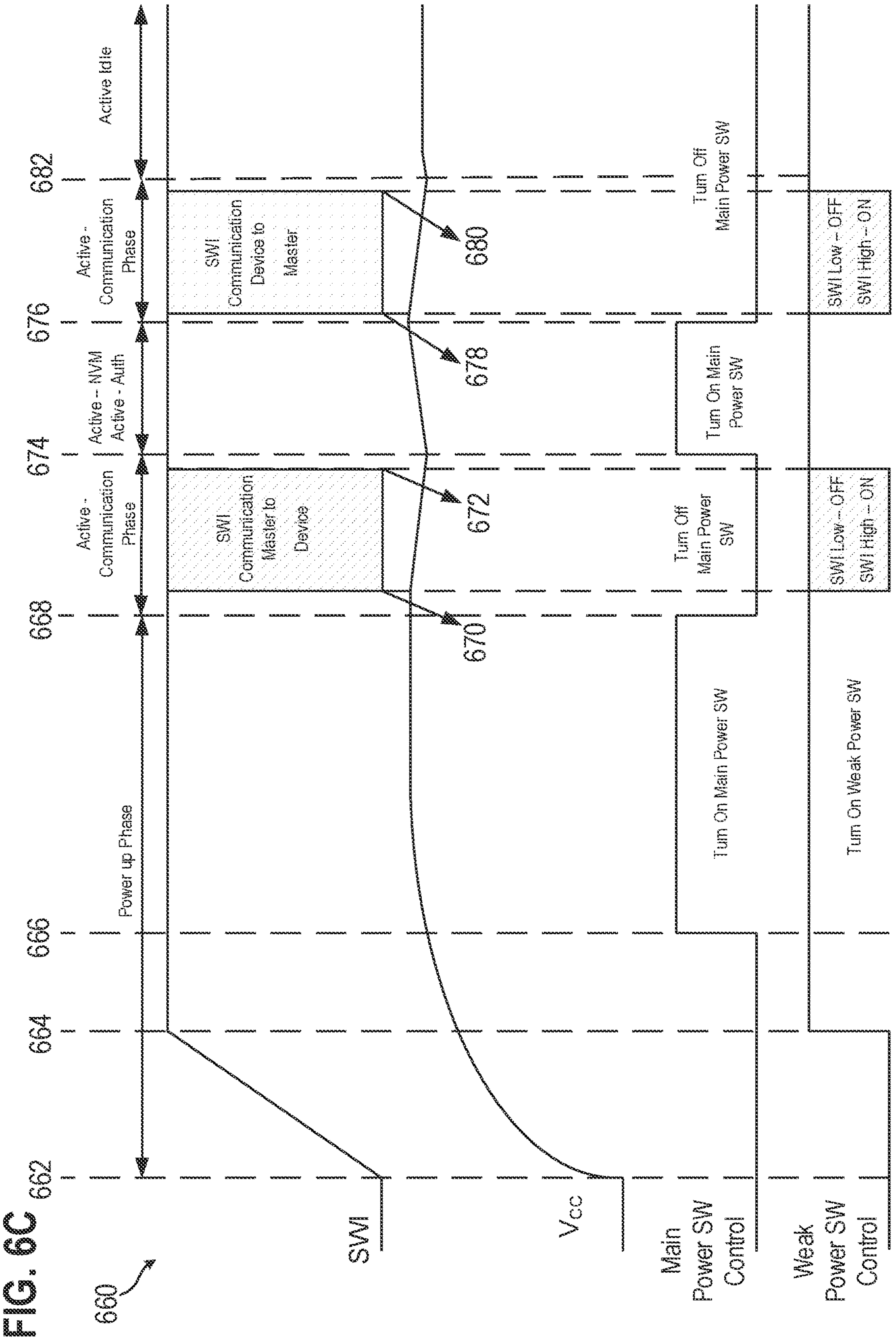
FIG. 6C shows schematically a time diagram illustrating an operation of a charging control circuit, according to various aspects.

FIG. 6C shows a timing diagram 660 illustrating an exemplary operation of the charging control circuit 634 according to various aspects. It is understood that the operation described in relation to FIG. 6C is only an example, and other types of operations or sequences of operations may be provided.

At 662, in the initial phase when the signal SWI is raising, the signal SWI is charging up the capacitor 632 cap through the diode 636.

At 664, once the signal SWI reaches a high level, the weak power switch 644 is turned on in the analog module (illustratively, in the charging control circuit 634) to increase the charging current to speed up the charging of the capacitor 632 and to provide current to support the startup operation of the single-wire device 604.

At 666, once the digital power is up, the main controller 642 will take over the role of controlling the main power switch 640 and it will turn on the main power switch 640 to support high current operation during the power up phase as needed.

At 668, the main controller 642 will switch off the main power switch 640 after a power up delay. This would reduce the power switch strength (e.g., leaving only the weak switch 644 active), which allows the master device 602 to communicate. For example, by pulling the SWI signal to low in order to transmit a binary 0 and switching the SWI signal to high to transmit a binary 1. It is not possible for the master device 602 to pull the SWI signal to low if the main power switch is on.

At 670, when the host 602 starts to communicate, the main power switch 640 will be in OFF state and the weak power switch 644 will be in ON state depending on the logic level of the SWI communication. When the SWI signal is high, the weak switch 644 will be turn on, when the SWI signal is low, the weak switch 644 will be turn off to prevent the $V_{CC}$ voltage from discharging through the weak switch 644 when the SWI signal is low. The SWI signal will be charging or providing current through intrinsic diode 636 and the weak switch 644.

At 672, when the SWI communication has ended, the controller (illustratively, the charging control circuit 634) will determine the task that it needs to perform when receiving the bus command.

At 674, when controller is in Active-NVM (active non-volatile memory) and Active-Auth (active authentication) task, it will turn on the main power switch 640. This allows the SWI bus to charge up the capacitor 632 through the main power switch 640 which provides a low electrical resistance path compared to the high electrical resistance second electrical path associated with the weak switch 644. This correspondingly increases the charging rate of the capacitor 632 thus allowing the higher power consumption requirement of the Active-NVM (active non-volatile memory) and Active-Auth (active authentication) task to be met. In some implementations, the main power switch 640 is turned on in response to the expected power consumption of the device for the Active-NVM and Active-Auth being above a predefined threshold.

At 676, when controller finishes the Active-NVM or Active-Auth task, it will turn off the main power switch 640. This reduces the power switch strength, which allows the host device 602 or the single-wire device 604 (e.g., the device transceiver) to drive SWI bus (e.g., to drive the signal SWI low).

At 678, when the controller (e.g., one or more processors of the single-wire device 604) wants to send the data to the master device 602, it will send the data with the main power switch 640 turned off. The control of the weak power switch 644 will depend on the logic level of the SWI interface.

At 680, after the controller has finished sending data on the SWI bus, it will prepare to exit the Active-Communication mode to enter the Active-Idle mode.

At 682, the controller will transit to Active-Idle mode with the main power switch 640 turned off.

Figure 7:
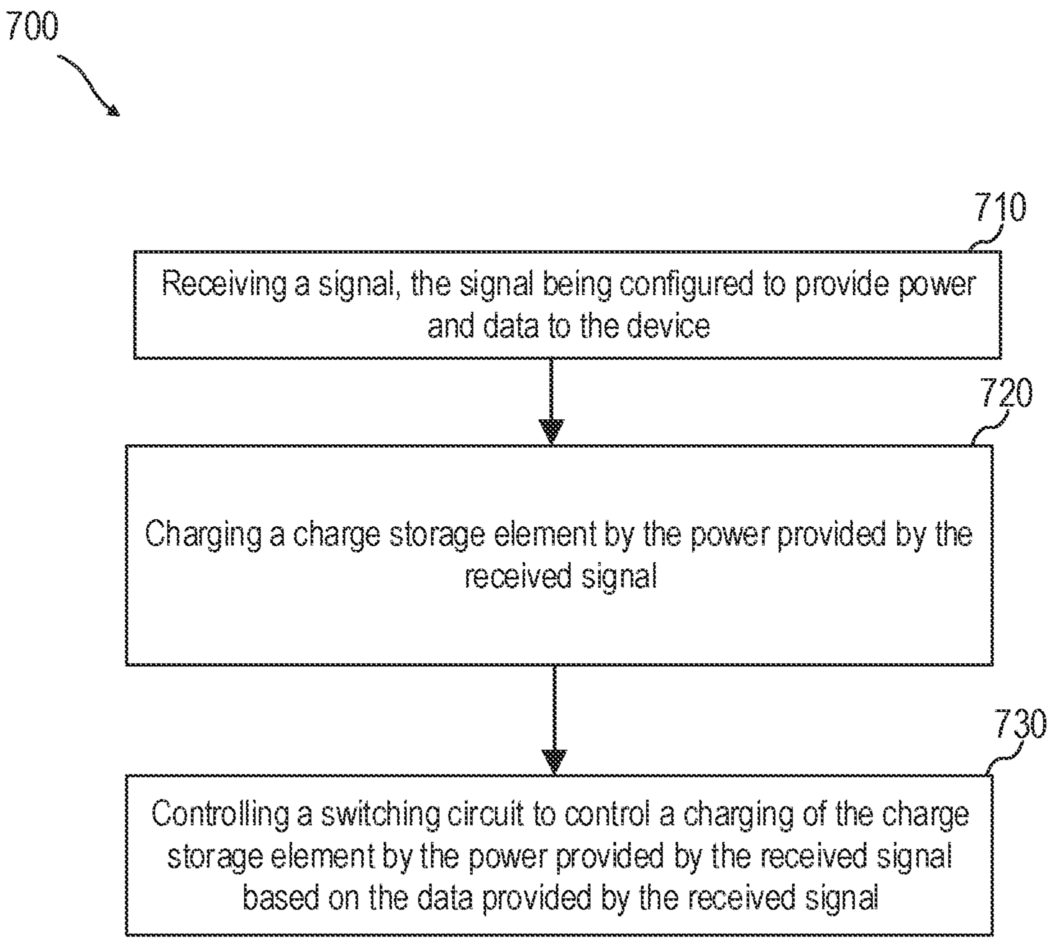
FIG. 7 shows a schematic flow diagram of a method for operating a device, according to various aspects.

FIG. 7 shows a schematic flow diagram of a method 700 for operating a device (e.g., for operating the device 200), according to various aspects. In some aspects, the device may be configured as a slave device for use in a single-wire interface system, for example in combination with a host device (and optionally with one or more other slave devices).

The method 700 may include, in 710, receiving a signal, the signal being configured to provide power and data to the device. In some aspects, the signal may be a signal at a single-wire interface, e.g. the signal may be received at the device via a single-wire interface.

The method 700 may include, in 720, charging a charge storage element by the power provided by the received signal.

The method 700 may include, in 730, controlling a charging control circuit to control a charging of the charge storage element by the power provided by the received signal based on the data provided by the received signal. In some aspects, the method 700 may include controlling a charging control circuit to control a charging of the charge storage element in accordance with a level of the received signal.

In some aspects, the data provided by the received signal define an operation of the device, and the method may include controlling the charging control circuit to control the charging of the charge storage element based on an expected power consumption associated with the operation defined by the data.

In some aspects, the method 700 may include controlling the charging control circuit to control the charging of the charge storage element such that the charge storage element receives a first power from the received signal in case the expected power consumption of the device is above a predefined threshold and such that the charge storage element receives a second power (e.g., lower than the first power) from the received signal in case the expected power consumption of the device is below the predefined threshold.

In some aspects, the method 700 may include controlling the charging control circuit to control a resistance of an electrical path via which the charge storage element receives the power (e.g., a current) provided by the received signal.

In some aspects, the method 700 may include controlling the charging control circuit to provide a first electrical path via which the charge storage element receives the power provided by the received signal in case an expected power consumption of the device is above a predefined threshold, the first electrical path having a first resistance, and to provide a second electrical path via which the charge storage element receives the power provided by the received signal in case an expected power consumption of the device is below the predefined threshold, the second electrical path having a second resistance (e.g., greater than the first resistance).

In some aspects, the method 700 may include controlling the charging control circuit to connect the first electrical path in case an expected power consumption of an operation defined by the data provided by the received signal is above a predefined threshold, and controlling the switching circuit to disconnect the first electrical path in case the expected power consumption of the operation defined by the data provided by the received signal is below the predefined threshold.

In some aspects, the method 700 may include controlling the charging control circuit to disconnect the first electrical path after completion of the operation defined by the data provided by the received signal.

In some aspects, the method 700 may include controlling the charging control circuit to connect the second electrical path in response to the received signal being at a first (e.g., high) level and to disconnect the second electrical path in response to the received signal being at a second (e.g., low) level. In some aspects, the method 700 may include controlling the charging control circuit to maintain the second electrical path connected as long as the received signal is in at the first level.

In some aspects, the method 700 may include controlling the charging control circuit to provide an electrical path via which the charge storage element receives the power provided by the received signal bypassing a decoupling element (e.g., a diode) to which the charge storage element is connected.

In some aspects, the method 700 may include receiving a configuration signal, and controlling the charging control circuit to enable the control of the charging of the charge storage element in case the configuration signal indicates that an indirect power mode is to be selected. In some aspects, the method 700 may include controlling the charging control circuit to disable the control of the charging of the charge storage element in case the configuration signal indicates that a direct power mode is to be selected.

In the following, various aspects of this disclosure will be illustrated.

Example 1 is a device configured to receive a signal, the signal being configured to provide power and data to the device; the device including: a charge storage element configured to be charged by the power provided by the received signal; and a charging control circuit operable (e.g., configured) to control a charging of the charge storage element by the power provided by the received signal based on the data provided by the received signal.

In example 2, the device of example 1 may optionally further include that the charging control circuit is operable (e.g., configured) to control the charging of the charge storage element in accordance with a level of the received signal.

In example 3, the device of example 1 or 2 may optionally further include that the data provided by the received signal define an operation of the device, and that the charging control circuit is operable (e.g., configured) to control the charging of the charge storage element based on an expected power consumption associated with the operation defined by the data.

In example 4, the device of example 3 may optionally further include that the charging control circuit is operable (e.g., configured) to control the charging of the charge storage element such that the charge storage element receives a first power from the received signal in case the expected power consumption of the device is above a predefined threshold and such that the charge storage element receives a second power from the received signal in case the expected power consumption of the device is below the predefined threshold.

In some aspects, the second power may be lower than the first power.

In example 5, the device of any one of examples 1 to 4 may optionally further include that the charging control circuit is operable (e.g., configured) to control the charging of the charge storage element by controlling a resistance of an electrical path via which the charge storage element receives the power provided by the received signal.

In example 6, the device of example 5 may optionally further include that the charging control circuit is operable (e.g., configured) to control the charging of the charge storage element such that a first resistance of the electrical path via which the charge storage element receives the power provided by the received signal is provided in case an expected power consumption of the device is above a predefined threshold and such that a second resistance of the electrical path is provided in case the expected power consumption of the device is below the predefined threshold.

In some aspects, the second resistance may be greater than the first resistance.

In example 7, the device of any one of examples 1 to 6 may optionally further include that the charging control circuit includes a first switch configured to provide a first electrical path via which the charge storage element receives the power provided by the received signal.

In some aspects, the first electrical path may have a first resistance. In some aspects, the first electrical path may be a low resistance path.

In some aspects, the first switch and the charge storage element may be connected in series to one another.

In example 8, the device of example 7 may optionally further include that the charging control circuit includes a first controller, the first controller being configured to control the first switch based on the data provided by the received signal.

In example 9, the device of example 8 may optionally further include that the first controller is configured to activate the first switch to connect the first electrical path in case an expected power consumption of an operation defined by the data provided by the received signal is above a predefined threshold.

In some aspects, the first controller may be configured to de-activate the first switch to disconnect the first electrical path in case the expected power consumption of the operation defined by the data provided by the received signal is below the predefined threshold.

In some aspects, the first controller may be configured to de-activate the first switch to disconnect the first electrical path after completion of the operation defined by the data provided by the received signal.

In example 10, the device of any one of examples 7 to 9 may optionally further include that the first switch has an area in the range from about 1000 $\mu m^2$ to about 6000 $\mu m^2$, for example an area of 4800 $\mu m^2$.

In some aspects, the first switch has a resistance in the range from about 0.1Ω to about 2Ω, for example a resistance of about 0.84Ω.

In example 11, the device of any one of examples 1 to 10 may optionally further include that the charging control circuit includes a second switch configured to provide a second electrical path via which the charge storage element receives the power provided by the received signal.

In some aspects, the second electrical path may have a second resistance (e.g., greater than the first resistance). In some aspects, the second electrical path may be a high resistance path.

In some aspects, the second switch and the charge storage element may be connected in series with one another. In some aspects, the second switch and the first switch may be connected in parallel to one another.

In example 12, the device of example 11 may optionally further include that the charging control circuit includes a second controller, the second controller being configured to control the second switch in accordance with a level of the received signal.

In example 13, the device of example 12 may optionally further include that the second controller is configured to activate the second switch to connect the second electrical path in response to the received signal being at a first level and to de-activate the second switch to disconnect the second electrical path in response to the received signal being at a second level.

In some aspects, the first level may be a high voltage level and the second level may be a low voltage level. In some aspects, the first level may be associated with a logic "1" and the second level may be associated with a logic "0".

In some aspects, the second controller may be configured to maintain the second switch activated as long as the received signal is at the first level, e.g. at the high voltage level.

In example 14, the device of any one of examples 11 to 13 may optionally further include that the second switch has an area in the range from about 10 $\mu m^2$ to about 500 $\mu m^2$, for example an area of about 96 $\mu m^2$.

In some aspects, the second switch may have a resistance in the range from about 10Ω to about 100Ω, for example a resistance of about 42Ω.

In some aspects, the second switch may have an area smaller than an area of the first switch. In some aspects, the second switch may have a second resistance greater than the first resistance of the first switch.

In example 15, the device of examples 10 and 14 may optionally further include that a ratio between an area of the first switch to an area of the second switch is in the range from about 10 to about 100, for example about 50.

In some aspects, the first switch may be configured to withstand a greater current compared to the second switch.

In example 16, the device of any one of examples 1 to 15 may optionally further include that the charging control circuit includes a decoupling element configured to prevent a discharging of the charge storage element.

In some aspects, the decoupling element and the charge storage element may be connected in series with one another. In some aspects, the decoupling element and the first switch may be connected in parallel with one another and/or the decoupling element and the second switch may be connected in parallel with one another.

In example 17, the device of example 16 may optionally further include that the charging control circuit is operable (e.g., configured) to control the charging of the charge storage element by providing an electrical path via which the charge storage element receives the power provided by the received signal bypassing the decoupling element.

In example 18, the device of any one of examples 1 to 17 may optionally further include that the device is further configured to receive a reference signal. By way of example the reference signal may include a ground voltage.

In example 19, the device of any one of examples 1 to 18 may optionally further include that the charge storage element includes a capacitor.

In example 20, the device of any one of examples 1 to 19 may optionally further include that the device is further configured to receive a configuration signal.

In some aspects, the configuration signal may represent a configuration of an operation of the device.

In example 21, the device of example 20 may optionally further include that the charging control circuit is operable (e.g., configured) to enable a control of the charging of the charge storage element in case the configuration signal indicates that an inactive power mode is to be selected.

In example 22, the device of any one of examples 1 to 21 may optionally further include that the device is disposed on a device board.

In some aspects, the device may be integrated in the device board. In some aspects, the device board may be a printed circuit board.

In example 23, the device of any one of examples 1 to 22 may optionally further include that the device is configured to be connected to a second device.

In some aspects, the device may be configured to be connected to the second device via a single-wire connection. In some aspects, the second device may include a host device.

In example 24, the device of any one of examples 1 to 23 may optionally further include that the device is configured as a slave device for use in combination with a host device in a single-wire interface system.

Example 25 is a system including: a first device and a second device, wherein the first device and the second device are connected to one another via a single-wire connection, the single-wire connection being configured to carry a signal, the signal being configured to provide data and power to the second device; the second device including: a charge storage element configured to be charged by the power provided by the signal at the single-wire connection; and a charging control circuit configured to control a charging of the charge storage element by the power provided by the signal at the single-wire connection based on the data provided by the signal at the single-wire connection.

In example 26, the system of example 25 may optionally further include that the first device is configured as a master device and that the second device is configured as a slave device.

In example 27, the system of example 25 or 26 may optionally further include that the charging control circuit includes a first switch configured to provide a first electrical path for the signal at the single-wire connection to charge the charge storage element.

In some aspects, the first switch may be configured (e.g., dimensioned) to prevent the first device to pull the signal to a low level in case the first switch is activated.

In example 28, the system of any one of examples 25 to 27 may optionally further include that the charging control circuit includes a second switch configured to provide a second electrical path for the signal at the single-wire connection to charge the charge storage element.

In some aspects, the second switch may be configured (e.g., dimensioned) to allow the first device to pull the signal to a low level in case the second switch is activated.

Example 29 is a method for operating a device, the method including: receiving a signal, the signal being configured to provide power and data to the device; charging a charge storage element by the power provided by the received signal; and controlling a charging control circuit to control a charging of the charge storage element by the power provided by the received signal based on the data provided by the received signal.

In example 30, the method of example 29 may optionally further include controlling the charging control circuit to control the charging of the charge storage element in accordance with a level of the received signal.

In example 31, the method of example 29 or 30 may optionally further include that the data provided by the received signal define an operation of the device, and the method may further include controlling the charging control circuit to control the charging of the charge storage element based on an expected power consumption associated with the operation defined by the data.

In example 32, the method of example 31 may optionally further include controlling the charging control circuit to control the charging of the charge storage element such that the charge storage element receives a first power from the received signal in case the expected power consumption of the device is above a predefined threshold and such that the charge storage element receives a second power from the received signal in case the expected power consumption of the device is below the predefined threshold.

In some aspects, the second power may be lower than the first power.

In example 33, the method of any one of examples 29 to 32 may optionally further include controlling the charging control circuit to control the charging of the charge storage element by controlling a resistance of an electrical path via which the charge storage element receives the power provided by the received signal.

In example 34, the method of example 33 may optionally further include controlling the charging control circuit to provide a first electrical path via which the charge storage element receives the power provided by the received signal, the first electrical path having a first resistance, and/or controlling the charging control circuit to provide a second electrical path via which the charge storage element receives the power provided by the received signal, the second electrical path having a second resistance.

In some aspects, the second resistance may be greater than the first resistance.

In example 35, the method of example 34 may optionally further include controlling the charging control circuit to provide the first electrical path via which the charge storage element receives the power provided by the received signal in case an expected power consumption of the device is above a predefined threshold, and to provide the second electrical path via which the charge storage element receives the power provided by the received signal in case an expected power consumption of the device is below the predefined threshold.

In example 36, the method of example 35 may optionally further include controlling the charging control circuit to disconnect the first electrical path in case the expected power consumption of the operation defined by the data provided by the received signal is below the predefined threshold.

In some aspects, the method may include controlling the charging control circuit to disconnect the first electrical path after completion of the operation defined by the data provided by the received signal.

In example 37, the method of any one of examples 34 to 36 may optionally further include controlling the charging control circuit to connect or disconnect the second electrical path in accordance with a level of the received signal.

In example 38, the method of example 37 may optionally further include controlling the charging control circuit to connect the second electrical path in response to the received signal being at a first level and to disconnect the second electrical path in response to the received signal being at a second level.

In some aspects, the first level may be a high voltage level and the second level may be a low voltage level. In some aspects, the first level may be associated with a logic “1” and the second level may be associated with a logic “0”.

In some aspects, the method may include maintaining the second electrical path connected as long as the received signal is at the high voltage level.

In example 39, the method of any one of example 29 to 38 may optionally include controlling the charging control circuit to control the charging of the charge storage element by providing an electrical path via which the charge storage element receives the power provided by the received signal bypassing a decoupling element.

In example 40, the method of any one of example 29 to 39 may optionally further include receiving a reference signal. By way of example the reference signal may include a ground voltage.

In example 41, the method of any one of examples 29 to 40 may optionally further include that the charge storage element includes a capacitor.

In example 42, the method of any one of examples 29 to 41 may optionally further include receiving a configuration signal. In some aspects, the configuration signal may represent a configuration of an operation of the device.

In example 43, the method of example 42 may optionally further include controlling the charging control circuit to enable a control of the charging of the charge storage element in case the configuration signal indicates that an inactive power mode is to be selected.

In example 44, the method of any one of examples 29 to 43 may optionally further include that the device is configured to be connected to a second device.

In some aspects, the device may be configured to be connected to the second device via a single-wire connection. In some aspects, the second device may include a host device.

In example 45, the method of any one of examples 29 to 44 may optionally further include that the device is configured as a slave device for use in combination with a host device in a single-wire interface system.

LIST OF REFERENCE SIGNS

100 Single-wire System
102 Host device
104 Single-wire device
106 Single-wire connection
106*h* Conductive element
106*d* Conductive element
108 Substrate
110 Substrate
112 Supply terminal
114 Input/output terminal
116 Ground terminal
118 Supply terminal
120 Input/output terminal
122 Ground terminal
124 Ground connection
124*h* Conductive element
124*d* Conductive element
126 Pull-up resistor
128 Capacitor
130 Diode
200 Device
202 First signal
204 Second signal
206 Third signal
208 First terminal
210 Second terminal
212 Third terminal
214 Substrate
216 First conductive element
218 Second conductive element
220 Third conductive element
222 Charge storage element
224 Electrical path
226 Supply terminal
228 Charging control circuit
300*a* Charging control circuit
300*b* Charging control circuit
300*c* Charging control circuit
300*d* Charging control circuit
302 First switch
304 First controller
306 Second switch
308 Second controller
310 Decoupling element
400 Device
402 Single-wire connection
404 First terminal
406 Second terminal
408 Third terminal
410 First conductive element
412 Second conductive element
414 Third conductive element
416 Ground connection
418 Substrate
420 Power supply
422 Resistive element
500 System
502 First device
504 Second device
506 Single-wire connection
508 Ground connection
600 Single-wire interface system
602 Host device
604 Single-wire device
606 Single-wire connection
608 Substrate
610 Supply terminal
612 General purpose input/output terminal
614 Ground terminal
616 Power supply
618 Pull-up resistor
620 Ground connection
622 Substrate
624 Single-wire terminal
626 Configuration terminal
628 Ground terminal
630 Supply terminal
632 Capacitor
634 Charging control circuit
636 Diode
638 Switching element
640 Main switch
642 Main controller
644 Weak switch
646 Weak controller
648 Wakeup signal
650 First selection signal
652 Second selection signal
654 Configuration signal
656 Resistive element
660 Timing diagram
662 Event
664 Event
666 Event
668 Event

670 Event
672 Event
674 Event
676 Event
678 Event
680 Event
682 Event
700 Method
710 Method step
720 Method step
730 Method step

What is claimed is:

1. A device configured to receive a signal, the signal being configured to provide power and data to the device, the device comprising:

a charge storage element configured to be charged by the power provided by the received signal, wherein the data provided by the received signal define an operation of the device; and a charging control circuit configured to control a charging of the charge storage element by the power provided by the received signal, based on an expected power consumption associated with the operation defined by the data.

2. The device of claim 1, wherein the charging control circuit is configured to control the charging of the charge storage element in accordance with a level of the received signal.

3. The device of claim 1, wherein the charging control circuit is configured to control the charging of the charge storage element such that the charge storage element receives a first power from the received signal if the expected power consumption of the device is above a predefined threshold and such that the charge storage element receives a second power from the received signal if the expected power consumption of the device is below the predefined threshold.

4. The device of claim 1, wherein the charging control circuit is configured to control the charging of the charge storage element by controlling a resistance of an electrical path via which the charge storage element receives the power provided by the received signal.

5. The device of claim 4, wherein the charging control circuit is configured to control the charging of the charge storage element such that a first resistance of the electrical path via which the charge storage element receives the power provided by the received signal is provided if an expected power consumption of the device is above a predefined threshold and such that a second resistance of the electrical path is provided if the expected power consumption of the device is below the predefined threshold.

6. The device of claim 1, wherein the charging control circuit comprises a first switch configured to provide a first electrical path via which the charge storage element receives the power provided by the received signal.

7. The device of claim 6, wherein the charging control circuit comprises a first controller configured to control the first switch based on the data provided by the received signal, wherein the first controller is configured to activate the first switch to connect the first electrical path if an expected power consumption of an operation defined by the data provided by the received signal is above a predefined threshold.

8. The device of claim 7, wherein the charging control circuit comprises a second switch configured to provide a second electrical path via which the charge storage element receives the power provided by the received signal.

9. The device of claim 8, wherein the charging control circuit comprises a second controller configured to control the second switch in accordance with a level of the received signal.

10. The device of claim 9, wherein the second controller is configured to activate the second switch to connect the second electrical path in response to the received signal being at a first level and to de-activate the second switch to disconnect the second electrical path in response to the received signal being at a second level.

11. The device of claim 9, wherein the first switch is a strong switch and the second switch is a weak switch, wherein the first electrical path has a first resistance, and wherein the second electrical path has a second resistance greater than the first resistance, such that the second electrical path provides an electrical path for pulling low the received signal.

12. The device of claim 11, wherein the second controller is configured to activate the weak switch during a power-up phase of the device, and wherein the first controller is configured to activate the strong switch during the power-up phase of the device after the second controller has activated the weak switch.

13. The device of claim 1, wherein the device is configured as a slave device for use in combination with a host device in a single-wire interface system.

14. A system, comprising:

a first device and a second device, wherein the first device and the second device are connected to one another via a single-wire connection, the single-wire connection being configured to carry a signal, the signal being configured to provide data and power to the second device, wherein the second device comprises:

a charge storage element configured to be charged by the power provided by the signal at the single-wire connection, wherein the data provided by the signal at the single-wire connection define an operation of the second device; and a charging control circuit configured to control a charging of the charge storage element by the power provided by the signal at the single-wire connection, based on an expected power consumption associated with the operation defined by the data.

15. The system of claim 14, wherein the first device is configured as a master device, and wherein the second device is configured as a slave device.

16. The system of claim 14, wherein the charging control circuit comprises a strong switch and a weak switch, wherein the strong switch is configured to provide a first electrical path for charging of the charge storage element by the power provided by the signal at the single-wire connection, and wherein the weak switch is configured to provide a second electrical path for charging of the charge storage element by the power provided by the signal at the single-wire connection.

17. The system of claim 16, wherein the first electrical path has a first resistance, and wherein the second electrical path has a second resistance greater than the first resistance, such that the second electrical path provides a high resistance path for pulling low the received signal.

18. The system of claim 16, wherein the charging control circuit comprises a first controller configured to control the strong switch and a second controller configured to control the weak switch, wherein, during a power-up phase of the second device, the second controller is configured to activate the weak switch to provide the second electrical path, and the first controller is configured to activate the strong switch to provide the first electrical path after the second controller has activated the weak switch.

19. A method for operating a device, the method comprising:

receiving a signal configured to provide power and data to the device, wherein the data provided by the received signal define an operation of the device;

charging a charge storage element by the power provided by the received signal; and controlling a charging control circuit to control a charging of the charge storage element by the power provided by the received signal, based on an expected power consumption associated with the operation defined by the data.

20. The method of claim 19, wherein the charging control circuit comprises a strong switch and a weak switch, and the method further comprising:

during a power-up phase of the device, activating the weak switch to provide an electrical path for charging of the charge storage element by the power provided by the received signal; and subsequently activating the strong switch to provide a further electrical path for charging of the charge storage element by the power provided by the received signal.

* * * * *